(12) United States Patent
Ko et al.

(10) Patent No.: US 6,452,427 B1
(45) Date of Patent: Sep. 17, 2002

(54) DUAL OUTPUT CAPACITANCE INTERFACE CIRCUIT

(76) Inventors: Wen H. Ko, 1356 Forest Hills Blvd., Cleveland Heights, OH (US) 44118; Qiang Wang, 2709 Somerset Park Cir., San Jose, CA (US) 95132

(*) Notice: Subject to any disclaimer, the term of this patent is extended or adjusted under 35 U.S.C. 154(b) by 0 days.

(21) Appl. No.: 09/743,525
(22) PCT Filed: Jul. 7, 1999
(86) PCT No.: PCT/US99/15270
§ 371 (c)(1), (2), (4) Date: Jan. 5, 2001
(87) PCT Pub. No.: WO00/02014
PCT Pub. Date: Jan. 13, 2000

Related U.S. Application Data
(60) Provisional application No. 60/091,909, filed on Jul. 7, 1998.

(51) Int. Cl.[7] .................................................. H03C 3/00
(52) U.S. Cl. ........................ 327/101; 327/102; 327/103
(58) Field of Search ................................ 327/102, 101, 327/103

(56) References Cited

U.S. PATENT DOCUMENTS

| | | | |
|---|---|---|---|
| 3,288,656 A | 11/1966 | Nakamura | 148/33.5 |
| 3,993,939 A | 11/1976 | Slavin et al. | 317/246 |
| 4,104,595 A | 8/1978 | Overzet | 328/1 |
| 4,392,382 A | 7/1983 | Myers | 73/708 |
| 4,446,447 A | 5/1984 | McNamara | 331/42 |
| 4,517,622 A * | 5/1985 | Male | 361/283 |
| 4,720,623 A * | 1/1988 | DiCesare et al. | 219/497 |
| 4,820,971 A | 4/1989 | Ko et al. | 324/61 R |
| 5,349,864 A * | 9/1994 | Park et al. | 73/724 |
| 5,528,452 A | 6/1996 | Ko | 361/283.4 |
| 5,546,070 A | 8/1996 | Ellman et al. | 340/442 |
| 5,656,781 A | 8/1997 | Kankkunen | 73/724 |
| 5,706,565 A | 1/1998 | Sparks et al. | 29/25.42 |

FOREIGN PATENT DOCUMENTS

| | | |
|---|---|---|
| DE | 91 02 748.9 | 8/1991 |
| EP | 0302654 | 2/1989 |
| EP | 0499841 | 8/1992 |
| EP | 0610806 | 8/1994 |

OTHER PUBLICATIONS

Gui et al. High Aspect Ratio Single Crystalline Silicon Microstructures Fabricated With Multi Layer Substrates Transducers '97—1997 International Conference on Solid-State Sensors and Actuators vo. 1, Jun. 16–19, 1997 pp. 633–636, XP002121907 Chicago.

Wang et al. Si–To–Si Fusion Bonded Touch Mode Capacitive Pressure Sensors Mechatronics., vol. 8 Aug. 1998 pp 467–484, XP004134433 Pergamon Press, Oxford, U.K. ISSN: 0957–4158.

Maszara et al. Bonding of Silicon Wafers for Silicon–onInsulator J. Appl. Phys. vol. 64 (10) Nov. 15, 1988, pp. 4943–4950.

Shimbo et al. Silicon–to–Silicon Direct Bonding Method, J. Appl. Phys. vol. 60 (8) Oct. 15, 1986 pp. 2987–2991.

Jornod et al. High–Precision Capacitive Absolute Pressure Sensor Sensors and Actuators vol. 17 (1989) pp. 415–421.

Hanneborg et al. A Capacitive Pressure Sensor With Low TC0 and High Long–Term Stability Sensors and Actuators, A21–A23 (1990) pp. 151–154.

(List continued on next page.)

*Primary Examiner*—Tuan T. Lam
*Assistant Examiner*—Hiep Nguyen
(74) *Attorney, Agent, or Firm*—Howard M. Cohn

(57) ABSTRACT

A dual output capacitance interface circuit (100) based on switched capacitor circuits and charge subtraction technique provides both voltage output (104) and frequency output (106). The circuit is programmable independently with sensitivity and offset adjustment, and is insensitive to fixed stray capacitance. Temperature compensation methods are described.

2 Claims, 12 Drawing Sheets

OTHER PUBLICATIONS

Peters et al. Ultra–Stable High–Temperature Pressure Sensors Using Silicon Fusion Bonding Sensors and Actuators, A21–A23 (1990) pp. 96–101.

Steinmann et al. Mechanical Behaviour of Micromachined Sensor Membranes Under Uniform External Pressure Affected By In–Plane Stresses Using a Ritz Method and Hermite Polynomials Sensors and Actuators, A48 (1995) pp. 37–46.

Barth, Philip W. Silicon Fusion Bonding for Fabrication of Sensors, Actuators and Microstructures Sensors and Actuators, A21–A23 (1990) pp. 919–926.

Wang et al. Modeling of Touch Mode Capacitive Sensors and Diaphragms Sensors and Actuators, 2302 (1999).

Maseech et al. Plastic Deformation of Highly Doped Silicon Sensors and Actuators, A21–A23 (1990) pp. 861–865.

Bourouina et al. Variational Method for Tensile Stress Evaluation and Application to Heavily Boron–Doped Square–Shaped Silicon Diaphragms Sensors and Actuators, A49 (1995) pp. 21–27.

Ko et al. Touch Mode Capacitive Pressure Sensors Sensors and Actuators, 2303 (1999).

Ding et al. Touch Mode Silicon Capacitive Pressure Sensors 1990 ASME Winter Annual Meeting Nov. 25, 1990, pp. 111–117.

* cited by examiner

| $Q_{n-1}$ | | | $Q_n$ | | |
|---|---|---|---|---|---|
| $Q_1$ | $Q_2$ | $Q_3$ | $Q_1$ | $Q_2$ | $Q_3$ |
| 0 | 0 | 0 | 0 | 1 | 0 |
| 0 | 0 | 1 | 0 | 1 | 0 |
| 0 | 1 | 0 | 1 | 0 | 0 |
| 0 | 1 | 1 | x | 0 | 0 |
| 1 | 0 | 0 | 0 | 0 | 1 |
| 1 | 0 | 1 | 0 | 0 | x |
| 1 | 1 | 0 | 0 | 0 | 0 |
| 1 | 1 | 1 | 0 | 0 | 0 |

NON-OVERLAPPING PERIOD

DUAL OUTPUT CAPACITANCE INTERFACE CIRCUIT

CROSS-REFERENCE TO RELATED APPLICATIONS

This application is a continuation-in-part of commonly-owned, copending U.S. Provisional Patent Application No. 60/091,909, filed Jul. 7, 1998 by Ko et al.

Attention is directed to commonly-owned, copending PCT Patent Application No. 09/743,432, entitled METHOD OF FABRICATING SILICON CAPACITIVE SENSORS filed on even date herewith.

TECHNICAL FIELD OF THE INVENTION

The invention relates to circuits for interfacing with and deriving usable signals from transducers, more particularly capacitive force transducers such as pressure transducers, more particularly touch mode capacitive pressure sensors ("TMCPS").

BACKGROUND OF THE INVENTION

Capacitive pressure sensors typically include a pair of conductive elements, one of which is a fixed substrate another of which is a flexible diaphragm. In a conventional capacitive pressure sensor, as pressure increases a gap between the diaphragm and the underlying substrate decreases, and the capacitance of the sensor increases. The sensor is normally operated in a pressure range wherein the diaphragm is kept from actually contacting the underlying substrate. These sensors normally exhibit nonlinear characteristics. This inherent non-linearity has led to the development of many linearization schemes using complex and costly interface circuits which include analog circuits and amplifiers, segment linearization, microprocessor and ROM matrix linearization, etc.

Another type of capacitive pressure sensor is the touch mode capacitive pressure sensor ("TMCPS"). In touch mode operation, the diaphragm of the capacitive pressure sensor touches the underlying substrate which is covered by a thin insulating layer. As pressure increases, the contact area increases. The major component of output capacitance is the capacitance of the touched area with a thin layer of isolation layer which gives a larger capacitance per unit area compared to the air-gap capacitance in the untouched area. The touch mode device was developed to withstand harsh industrial environment, and with one or two orders of magnitude higher sensitivity than the normal (non-touch) mode operation in the near linear operation range, so that some of the stray capacity effects can be neglected. Advantages of touch mode capacitive pressure sensors include near linear output characteristics, large over-range pressure capability and robust structure that make them capable to withstand harsh industrial field environments. One application of interest for pressure sensors generally, and touch mode capacitive pressure sensors in particular, is in conjunction with an RF transponder inside a pneumatic tire.

Examples of capacitive pressure sensors can be found in U.S. Pat. No. 3,993,939 (November 1976), U.S. Pat. No. 5,528,452 (June 1996), U.S. Pat. No. 5.656,781 (August 1997), and U.S. Pat. No. 5,706,565 (January 1998).

A number of different constructions for touch mode capacitive pressure sensors (TMCPS) have been successfully designed and fabricated, including a silicon-glass TMCPS using anodic bonding technique to assemble a silicon diaphragm and a glass substrate with a metallized electrode, a silicon-silicon TMCPS using silicon fusion bonding to assemble a silicon diaphragm and silicon substrate, and a polysilicon TMCPS using surface micromachining technology. The present invention is particularly applicable to obtaining usable signals from a silicon fusion bonded capacitive pressure sensor (SFBCPS) such as is disclosed in Touch mode capacitive pressure sensors. Ko and Wang, published by Elsevier, in Sensors and Actuators 2303 (1999), as well as in the aforementioned commonly-owned, copending PCT Patent Application Ser. No. 09/743, 432 entitled METHOD OF FABRICATING SILICON CAPACITIVE SENSORS, filed on even date herewith. As discussed in the Elsevier article:

"FIG. 8 shows the outline of major steps of the fabrication of SFBCPS. Two silicon wafers are needed to make silicon fusion bonded capacitive pressure sensors. On wafer A, cavities are formed by silicon etching to define the gap. The bottom electrode on wafer A is formed by boron diffusion on the bottom of the cavity. A capacitive absolute pressure sensor needs an electrode feedthrough from a hermetically sealed cavity. In the design, the electrode feedthrough is lain down in a groove in the feedthrough region. (The groove is sealed after the bonding and etching processes). The isolation between two electrodes of the sensor is realized by the thermal oxide on the bonding surface. Due to doping concentration dependent oxidation, there is usually a step generated in the feedthrough region if the feedthrough electrode is on the surface. This will cause difficulties for silicon fusion bonding and hermetic sealing. The P+ doped electrode lain down in a groove, on the other hand, will not disturb the silicon fusion bonding surface even with a thick oxide growth. An extra sealing process by LTO deposition (400 mTorr, 450(C) is used to get a hermetically sealed reference cavity of the sensor after diaphragm formation. The pressure inside the cavity is around 150 mTorr after the sealing process. On wafer B, heavily boron doped diaphragm layer is formed by diffusion using solid source BN. After CMP, wafers A and B are bonded using Si fusion bonding, annealed at 1000 (C for 1 hour. P+ etch-stop technique is then used to fabricate the diaphragm with the designed thickness."

"The process discussed before can be simplified to a three-layer process. The structure of the fabricated sensor is illustrated in FIG. 10. The substrate as whole will be used as the bottom electrode. The gap is defined by the thickness of thermally grown oxide. Since there is no electrode feedthrough required, the hermetically sealed reference cavity can be formed by silicon to silicon fusion bonding without introducing extra processes. There are two capacitors constructed on the sensor chip. One is constructed by silicon diaphragm and the substrate separated by a reference cavity plus the surrounding bonding area. This capacitor is pressure sensitive. The other is constructed by silicon diaphragm and the substrate separated by the oxide in the rest of the bonding area. It is insensitive to pressure and can be used as a reference capacitor. The sensor chip is 1.0 mm×1.5 mm×0.4 mm in size. The diaphragm sizes range from 300 to 400 (mn in diameters. The process starts with the P-type substrate silicon wafer with 2.2-(m thermally grown oxide. The thickness of the oxide determines the initial gap of the capacitive pressure sensor. The oxide in cavity area is etched using RIE, which can give very vertical sidewall after etching. The same thickness of oxide on the backside wafer can be used not only as wet silicon etch mask, but also compensates the stress in the front side oxide so that the wafer can keep flat for the silicon fusion bonding. After cavity formation, a 0.1-(m thick oxide is grown for the electrical isolation after the diaphragm touches the bottom. The top silicon wafer with a well-defined thickness of heavily doped boron is then bonded to the cavity patterned substrate wafer using silicon fusion bond technique. No alignment is required during the bonding. Following the bonding, the Si—Si "wafer" is immersed in a dopant-dependent etchant (such as EDP, KOH and TMAH) to dissolve the silicon of the top wafer except the P+ layer. The P+ layer is then patterned to form the two capacitors and open the substrate contact window. Al contact pads are formed in the end using lift-off technique. This process utilizes single-side processing of silicon wafers. It only requires three non-critical masking steps and can produce very high yield."

It has been observed that one drawback of the silicon fusion bonded capacitive pressure sensors is that they have large zero-pressure capacitance, which limits applications of some capacitive interface circuits. The large zero-pressure capacitance originates from the large bonding area and the isolation material with a large dielectric constant surrounding the diaphragm. At zero-pressure, since the deflection of the diaphragm is small, the gap distance between diaphragm and the electrode on the bottom electrode is large. Therefore the capacitance of the air-gap capacitor contributes a small part to the overall capacitance at zero-pressure. The zero-pressure capacitance is mainly determined by the bonding area required to ensure the hermetic seal and mechanically support of the diaphragm. In the current design, the measured zero-pressure capacitance of the fabricated sensor is 7.3 pF, of which the bonding area contributes about 80%.

U.S. Pat. No. 4,104,595 (August 1978), incorporated in its entirety by reference herein, discloses a signal translating circuit for variable area capacitive pressure transducer. The circuit translates the capacitance change of a variable area capacitive transducer into a d-c voltage change. The transducer has two electrodes. As a force is applied to a deformable one of two electrodes, there is a change in the effective contact area between the electrodes in accordance with the applied pressure, producing a resulting change in capacitance. The signal translating circuit produces a d-c output signal which varies as a function of the transducer capacitance change.

U.S. Pat. No. 4,392,382 (July 1983), incorporated in its entirety by reference herein, discloses a linearized electronic capacitive pressure transducer. A variable capacitance pressure sensor ($C_X$) and a reference capacitor ($C_R$), and associated circuitry, provide a temperature compensated output signal which has a substantial linear variation as a function of sensed pressure.

U.S. Pat. No. 4,446,447 (May 1984), incorporated in its entirety by reference herein, discloses a circuit for converting pressure variation to frequency variation which includes a reference oscillator and a sensor oscillator coupled to a digital mixer. The reference oscillator includes a reference capacitor and a reference resistor. The sensor oscillator has a variable sensor timing capacitor and a sensor resistor.

U.S. Pat. No. 4,820,971 (November 1989), incorporated in its entirety by reference herein, discloses a precision impedance measurement circuit providing an output voltage (Vout) as a function of a capacitance (Cx) of a condition-sensing capacitor, and also describes the use of a reference capacitor having a capacitance (Co) which is unaffected by the sensed condition is disclosed.

BRIEF DESCRIPTION (SUMMARY) OF THE INVENTION

It is an object of the present invention to provide method and apparatus for interfacing with and deriving usable signals from transducers, more particularly capacitive force transducers such as pressure transducers, more particularly touch mode capacitive pressure sensors ("TMCPS"), as defined in one or more of the appended claims and, as such, having the capability of being implemented in a manner to accomplish one or more of the subsidiary objects.

According to the invention, a dual output capacitance interface circuit (100, FIG. 1) provides a voltage output (104) and a frequency output (106), each of which is related to a capacitance value of a condition-sensitive capacitance (Cx), such as a touch-mode capacitive pressure sensor. A capacitance-to-current (C-I) sub-circuit 110 converts capacitance to current. A current-to-frequency (I-F) sub-circuit (112) converts current to frequency signal. A current-to-voltage (I-V) sub-circuit (114) converts current to a DC voltage.

According to an aspect of the invention, the capacitance-to-current (C-I) converter comprises three capacitor controlled current sources controlled by a three-phase non-overlapping clock (116, FIG. 9). The three-phase non-overlapping clock (FIG. 9) may be driven by a clock generator (FIG. 10) comprising a Schmitt trigger.

According to an aspect of the invention, the current-to-frequency (I-F) converter (112, FIG. 5A) comprises a Schmitt trigger.

According to an aspect of the invention, the circuit is programmable independently with sensitivity and offset adjustment, and is insensitive to fixed stray capacitance.

The dual output capacitance interface circuit (100) is based on switched capacitor circuits and charge subtraction techniques for providing the voltage (104) and frequency (106) outputs. The circuit is programmable independently with sensitivity and offset adjustment, and is insensitive to fixed stray capacitance. Temperature compensation methods are described.

Other objects, features and advantages of the invention will become apparent from the description that follows.

BRIEF DESCRIPTION OF THE DRAWINGS

Reference will be made in detail to preferred embodiments of the invention, examples of which are illustrated in the accompanying drawings (FIGURES). The drawings are intended to be illustrative, not limiting. Although the invention will be described in the context of these preferred embodiments, it should be understood that it is not intended to limit the spirit and scope of the invention to these particular embodiments.

Certain elements in selected ones of the drawings may be illustrated not-to-scale, for illustrative clarity.

Figure 1:
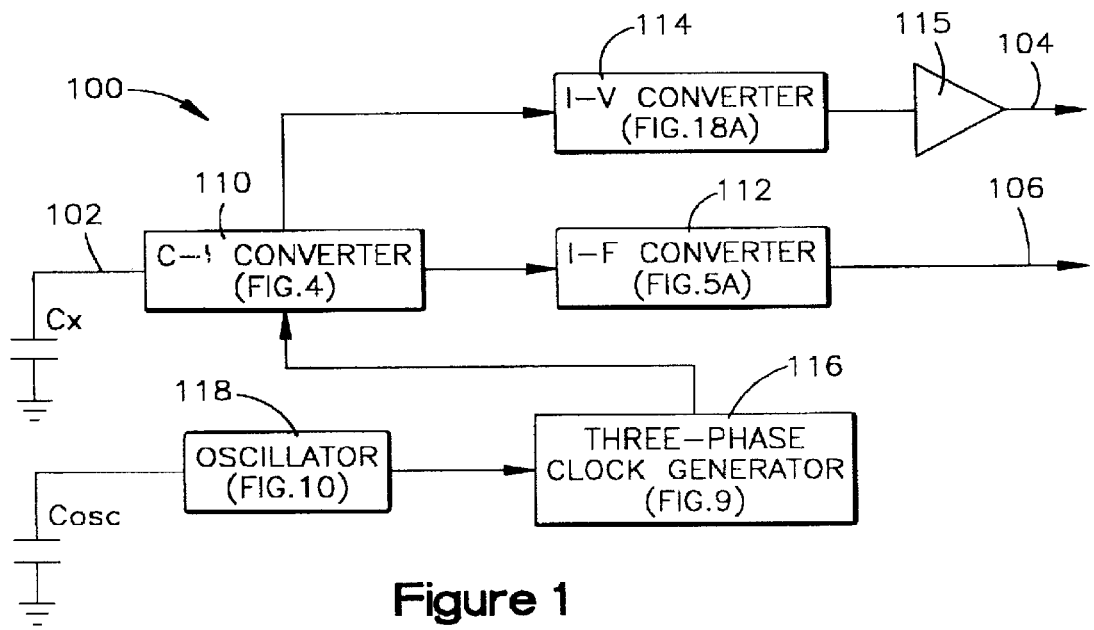

Often, similar elements throughout the drawings may be referred to by similar reference numerals. For example, the element 199 in a FIGURE (or embodiment) may be similar in many respects to the element 299 in another FIGURE (or embodiment).Such a relationship, if any, between similar elements in different FIGURES or embodiments will become apparent throughout the specification, including, if applicable, in the claims and abstract.

In some cases, similar elements may be referred to with similar numbers in a single FIGURE. For example, a plurality of elements 199 may be referred to as 199a 199b, 199c, etc.

The cross-sectional views, if any, presented herein may be in the form of "slices", or "near-sighted" cross-sectional views, omitting certain background lines which would otherwise be visible in a true cross-sectional view, for illustrative clarity.

Figure 2:
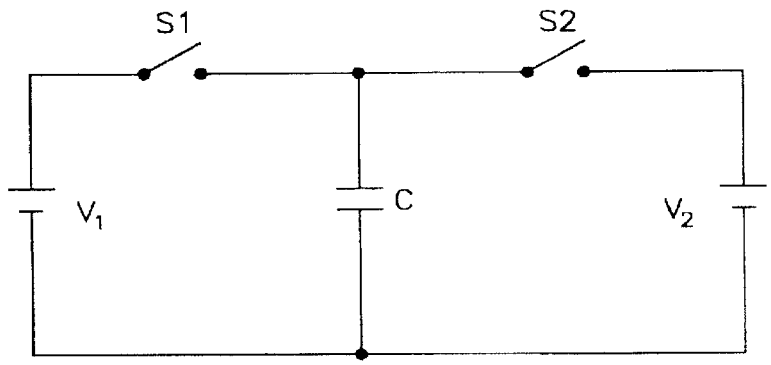
Figure 3:
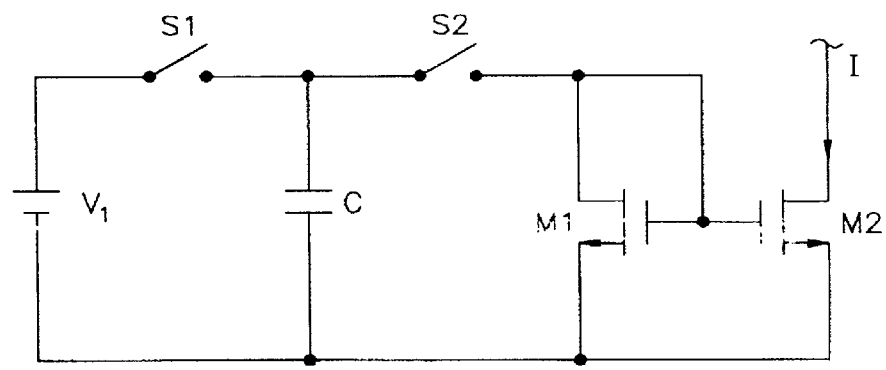
Figure 4:
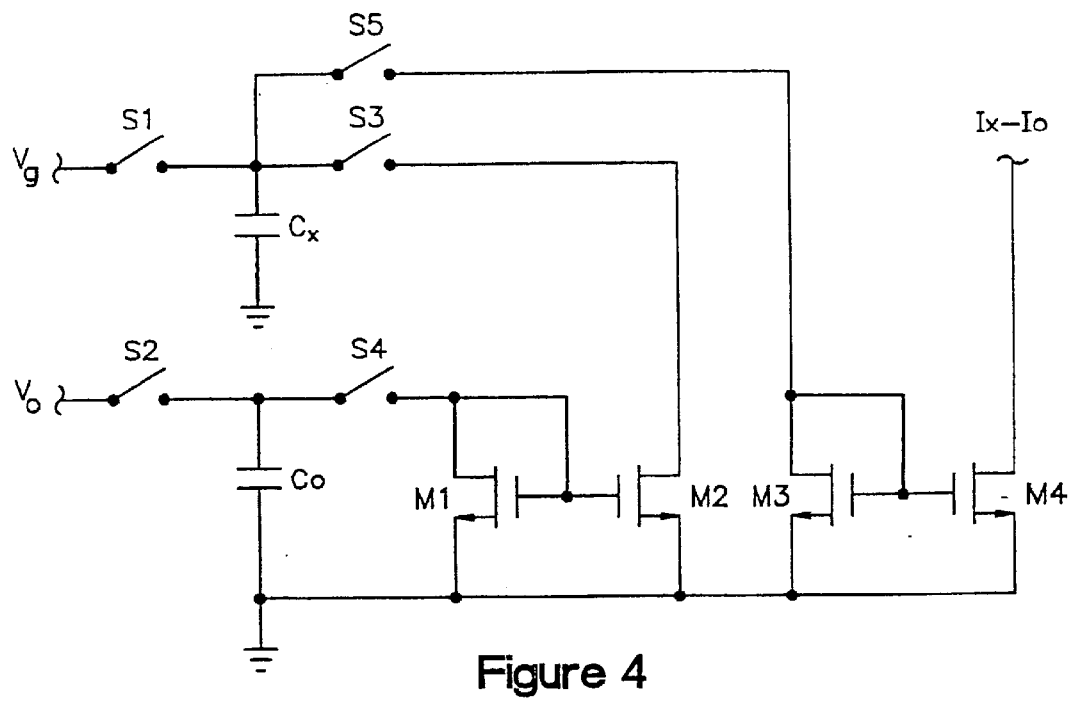
Figure 5A:
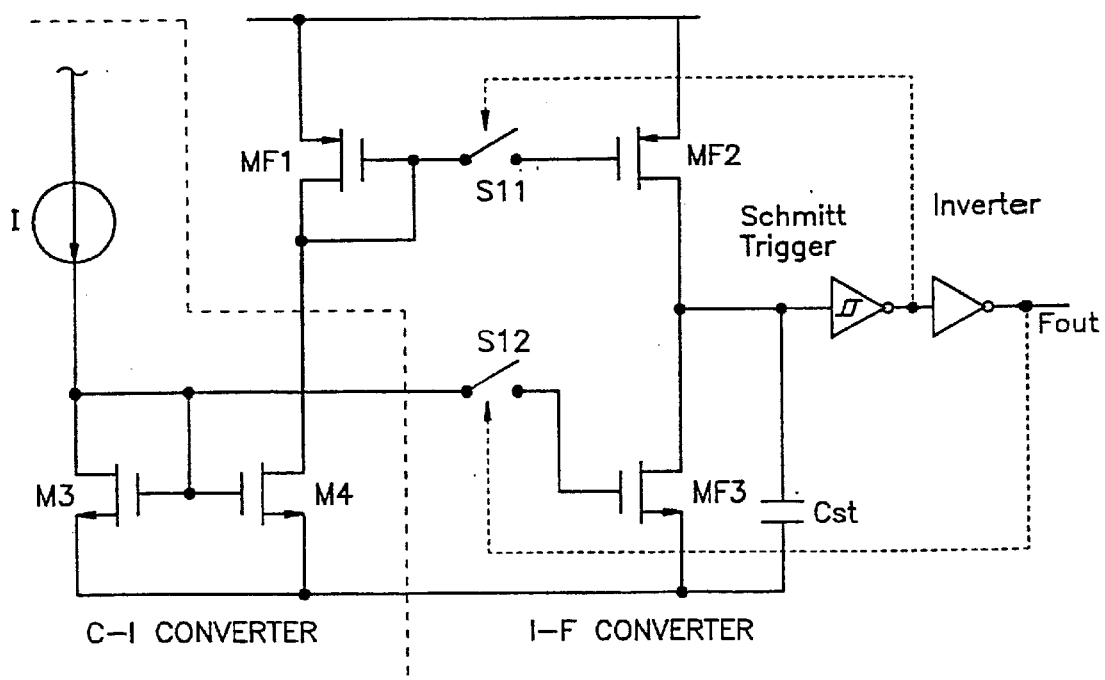
Figure 5B:
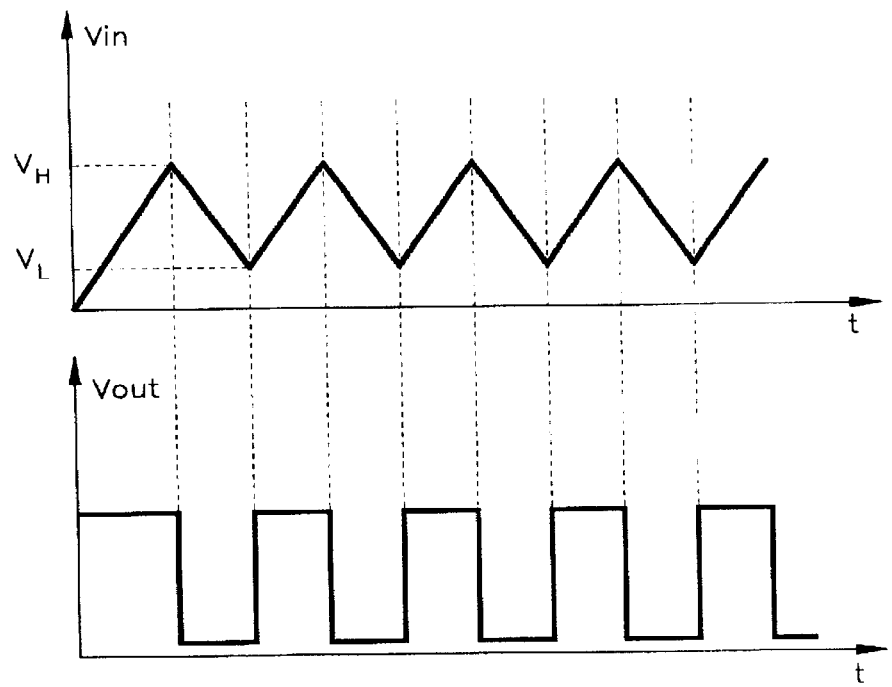
Figure 6:
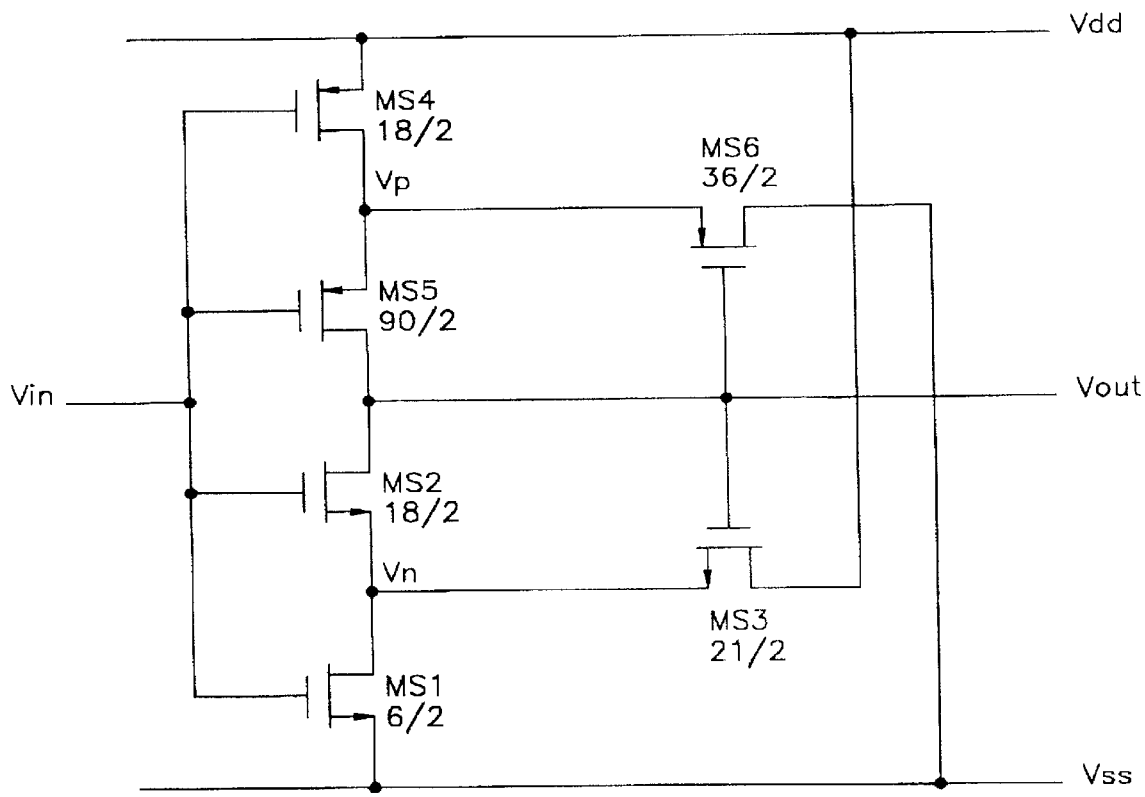
Figures 7, 8:
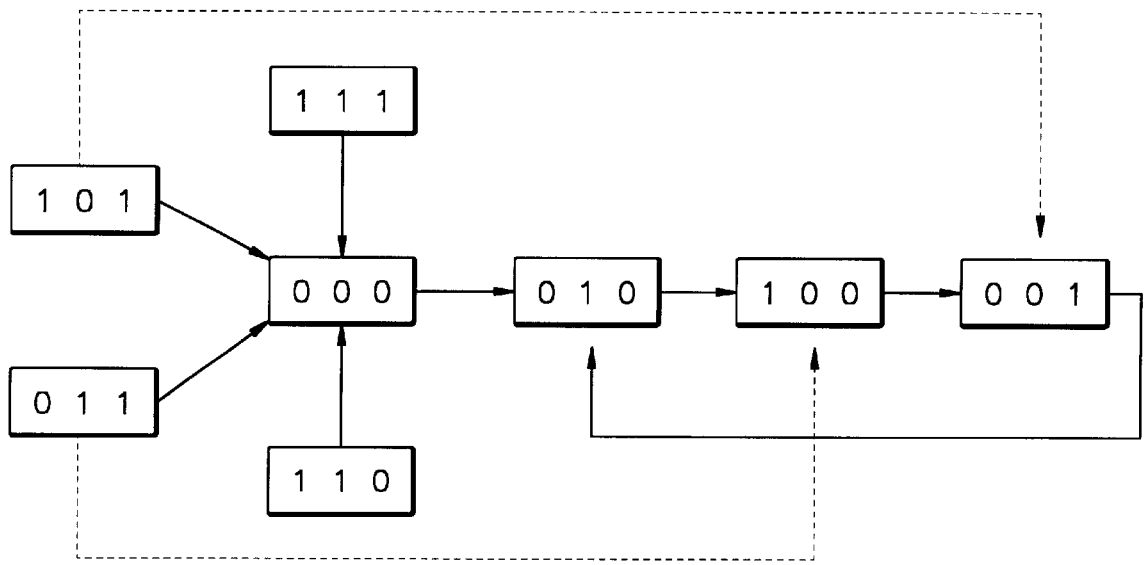
Figure 9:
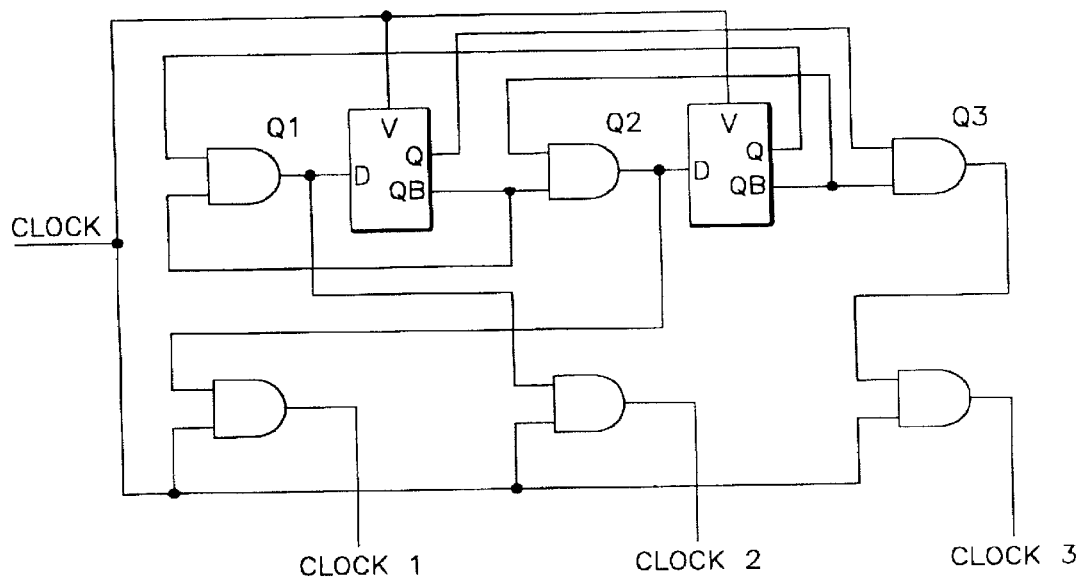
Figure 10:
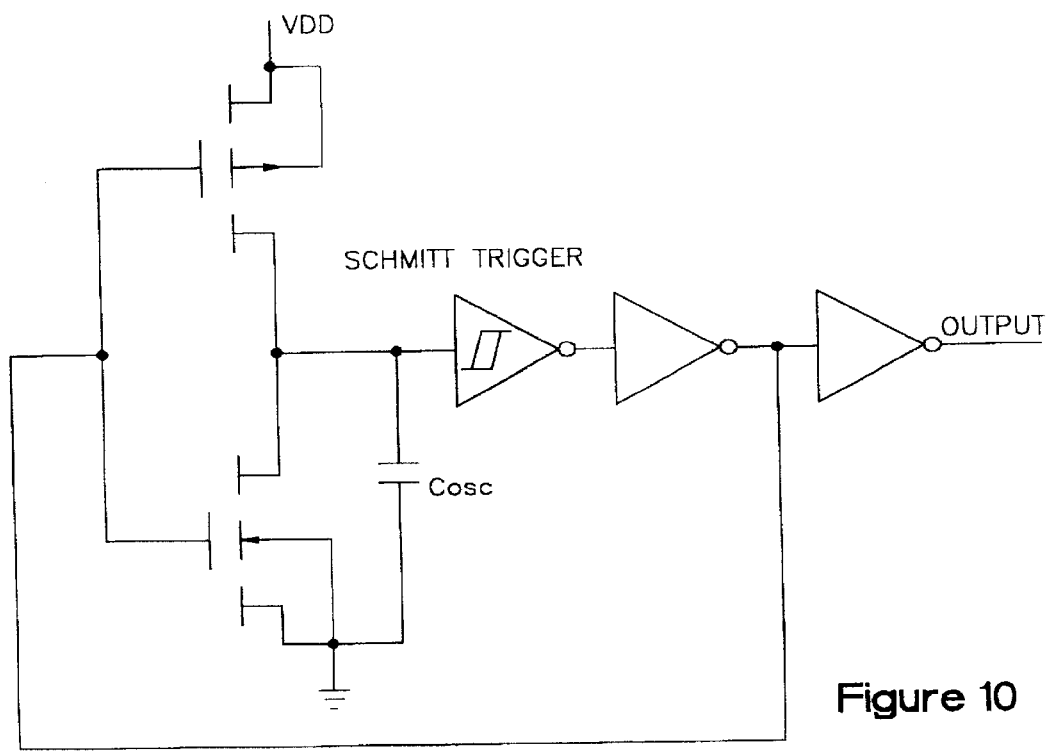
Figure 11:
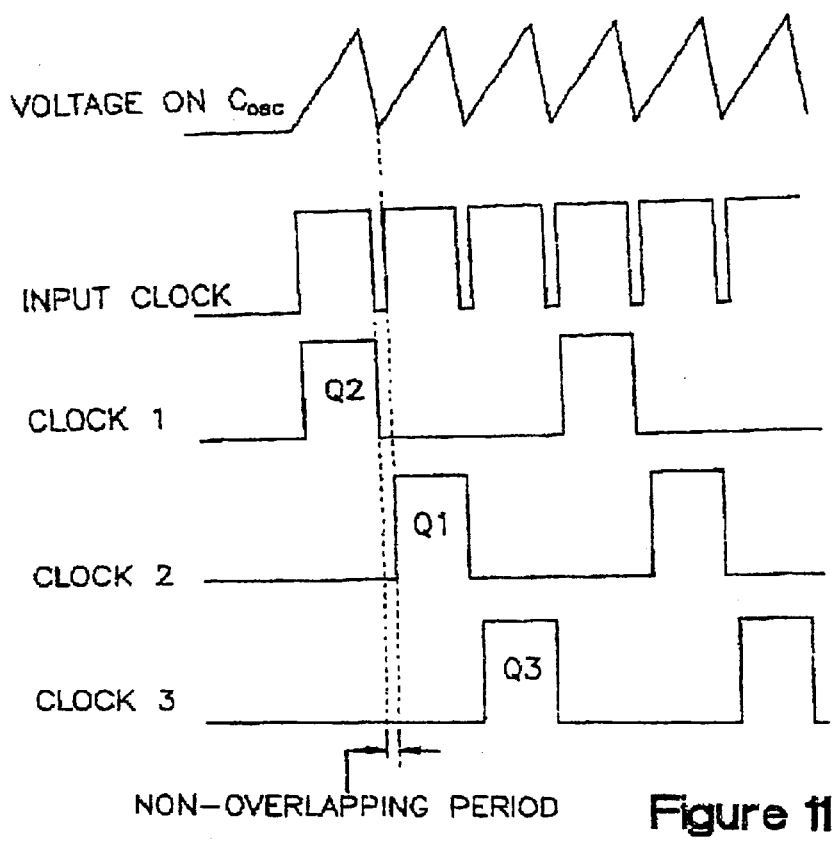
Figure 12:
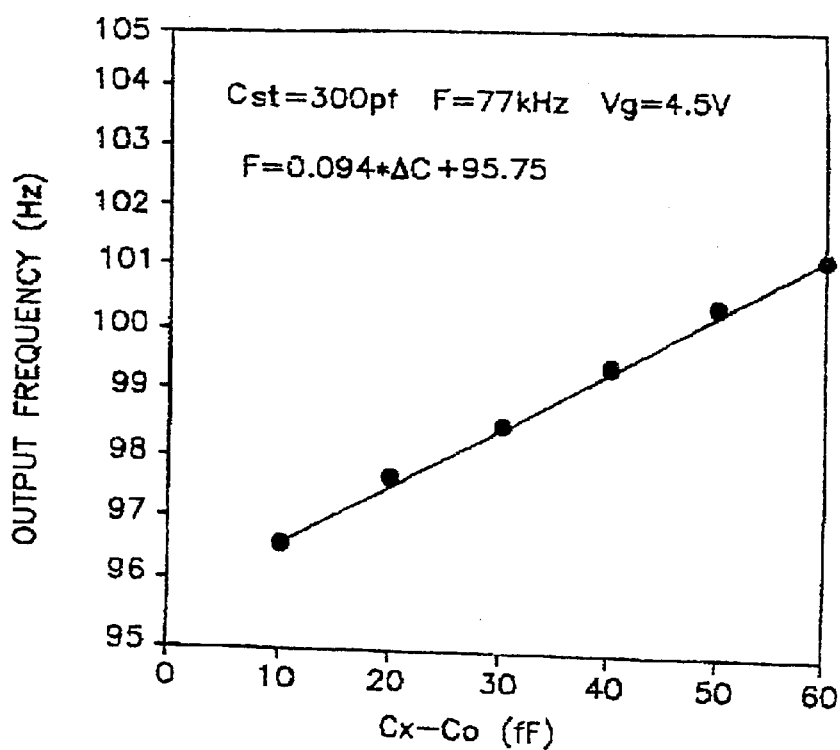
Figure 13:
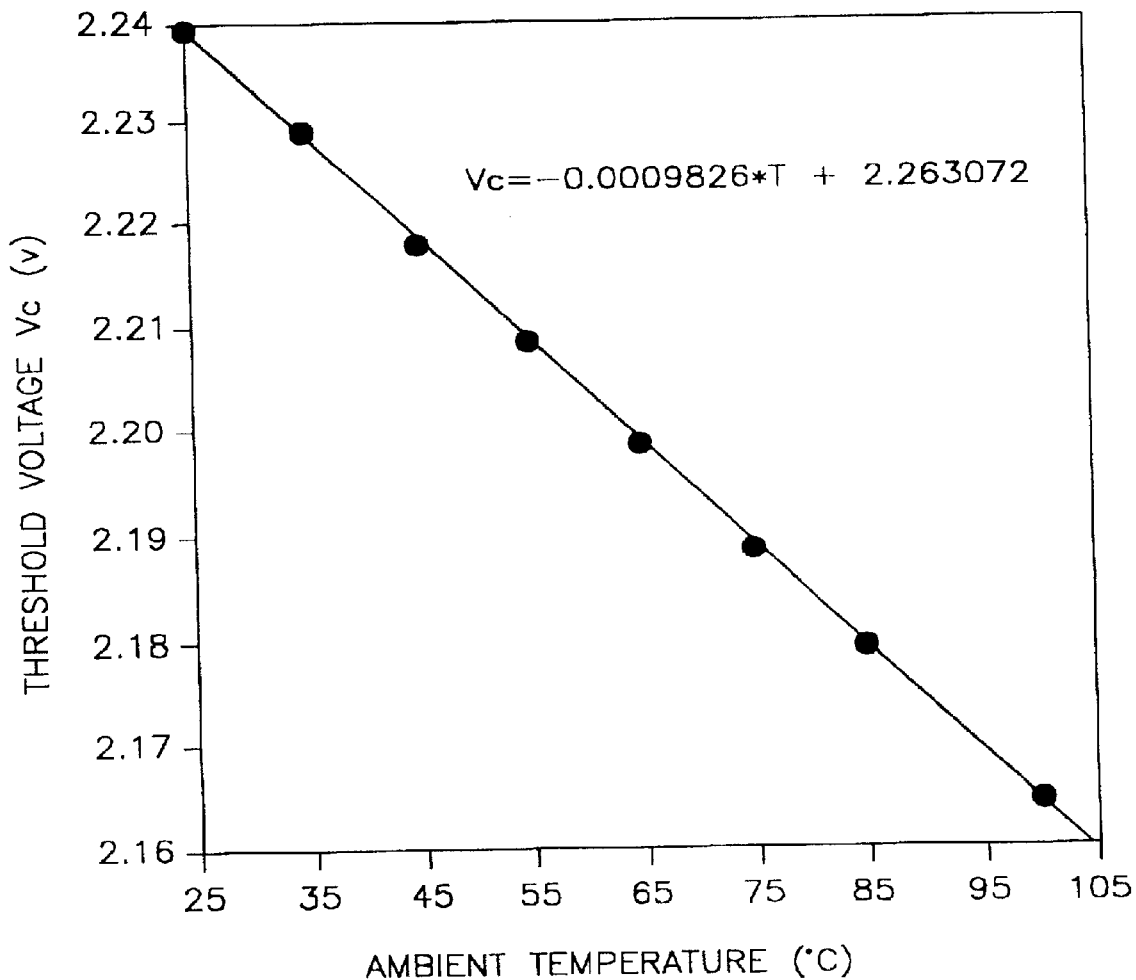
Figure 14A:
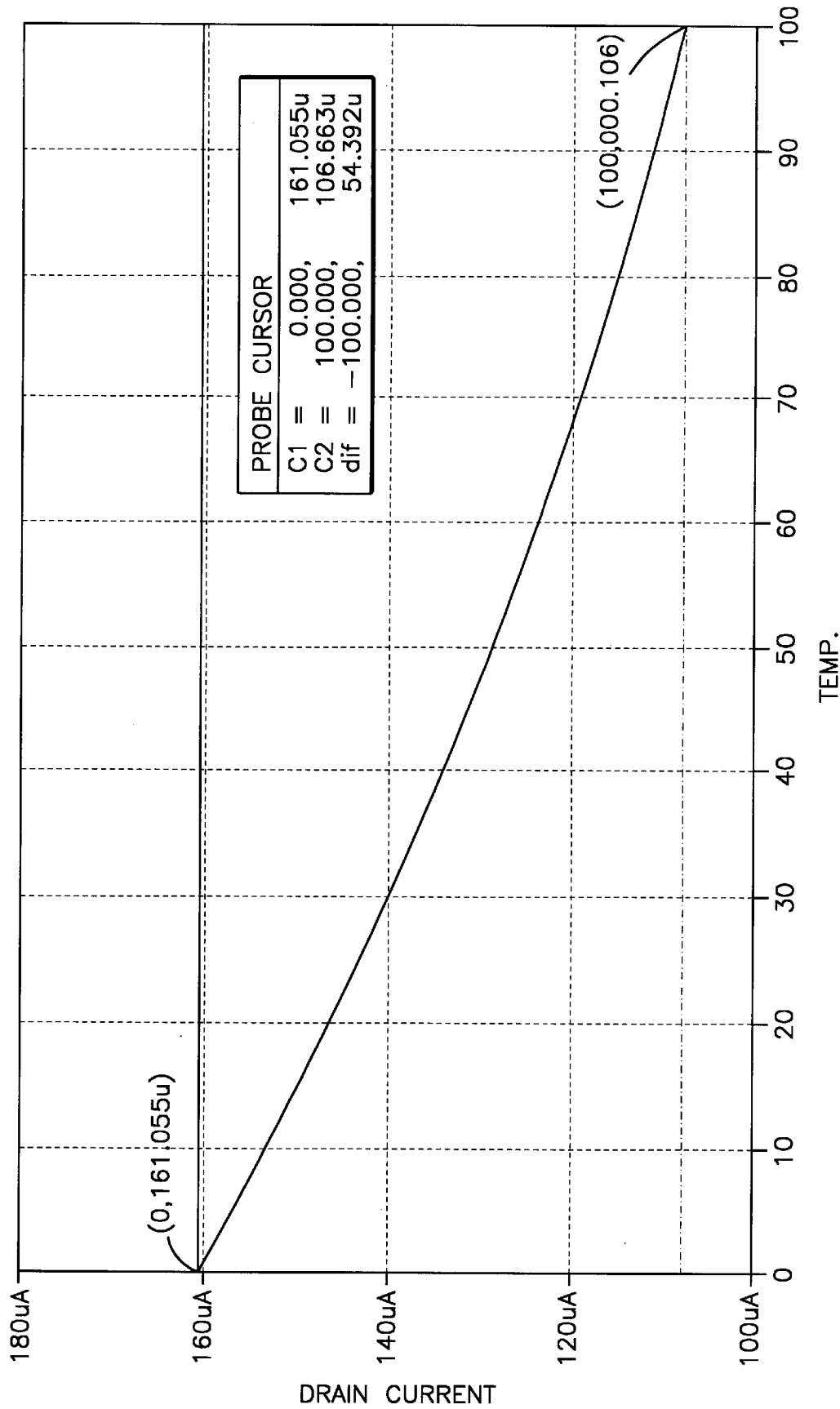
Figure 14B:
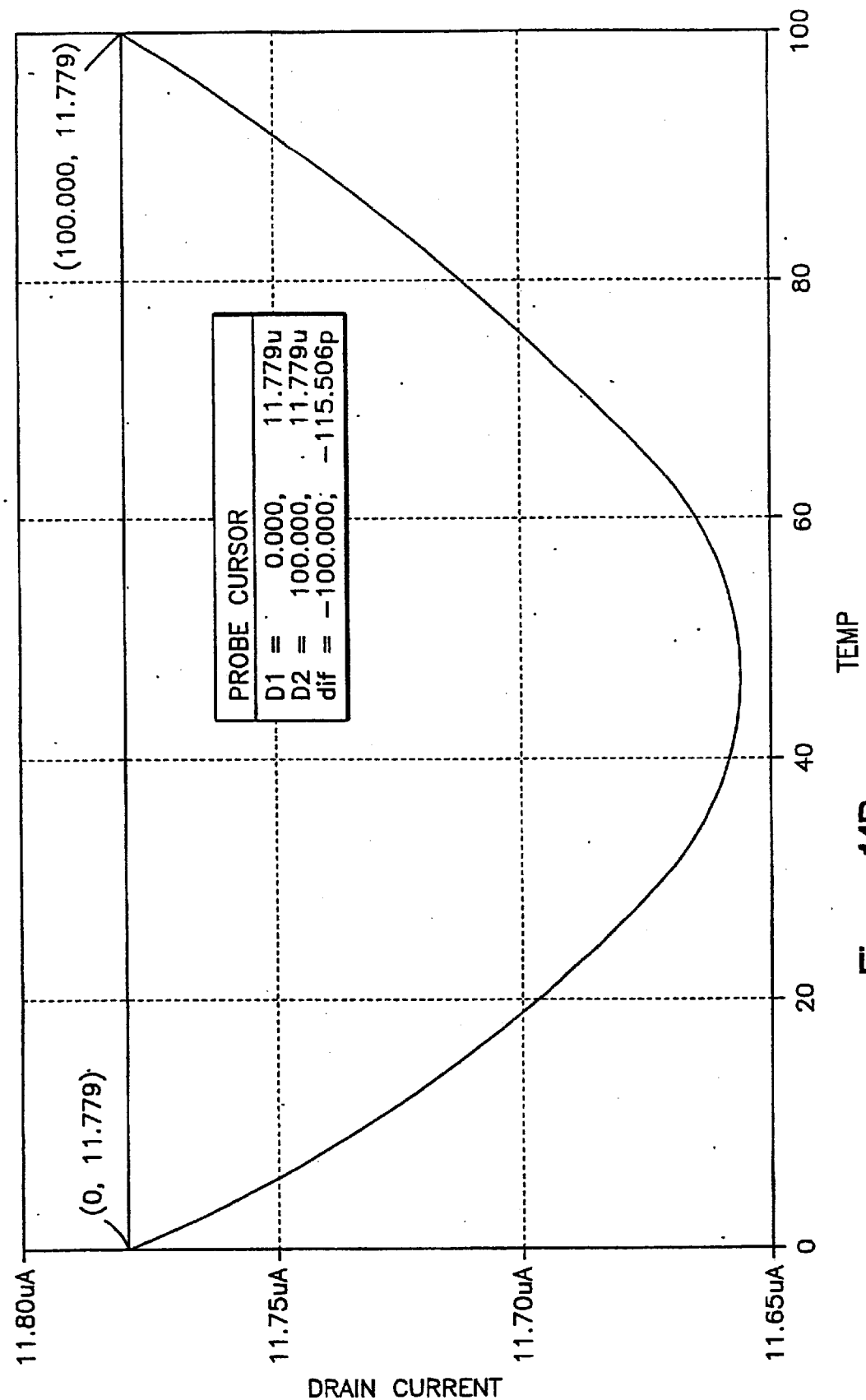
Figure 15:
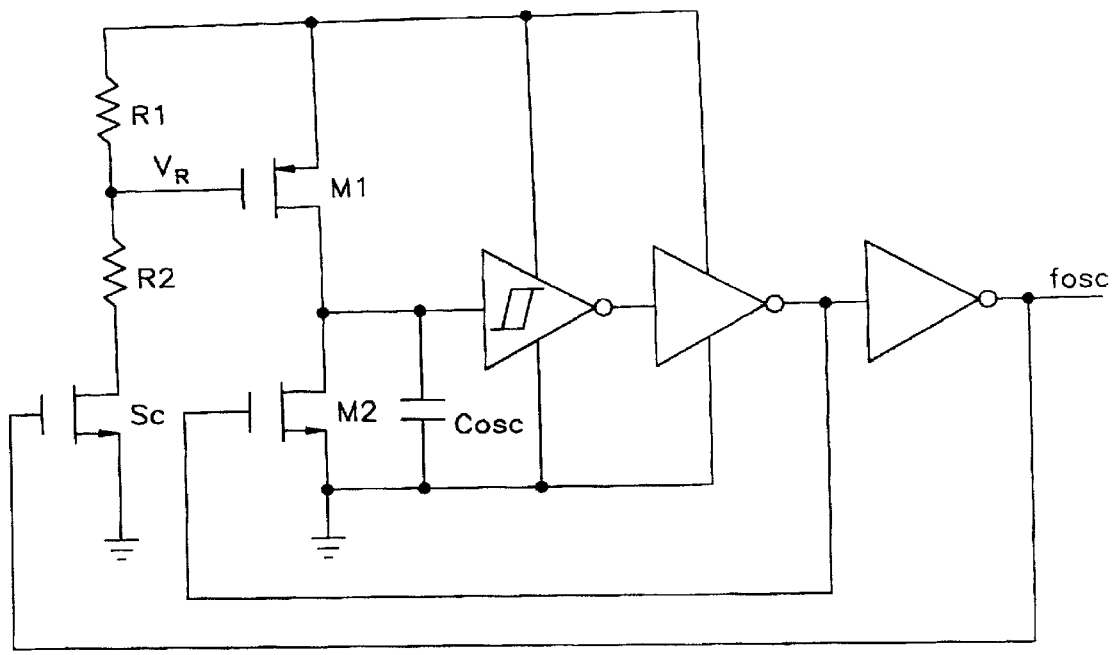
Figure 16:
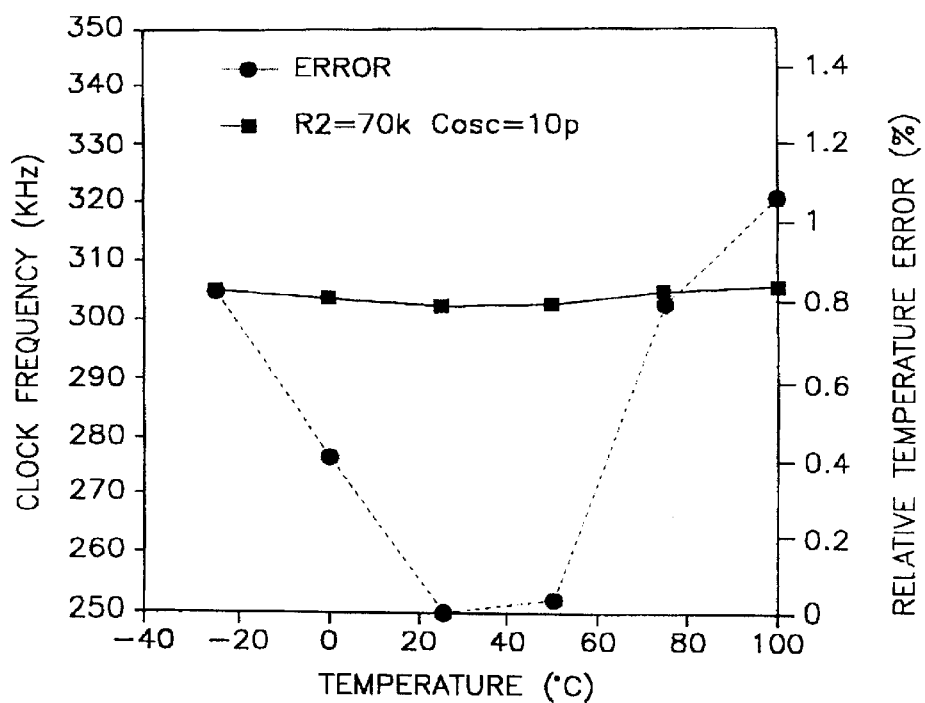
Figure 17:
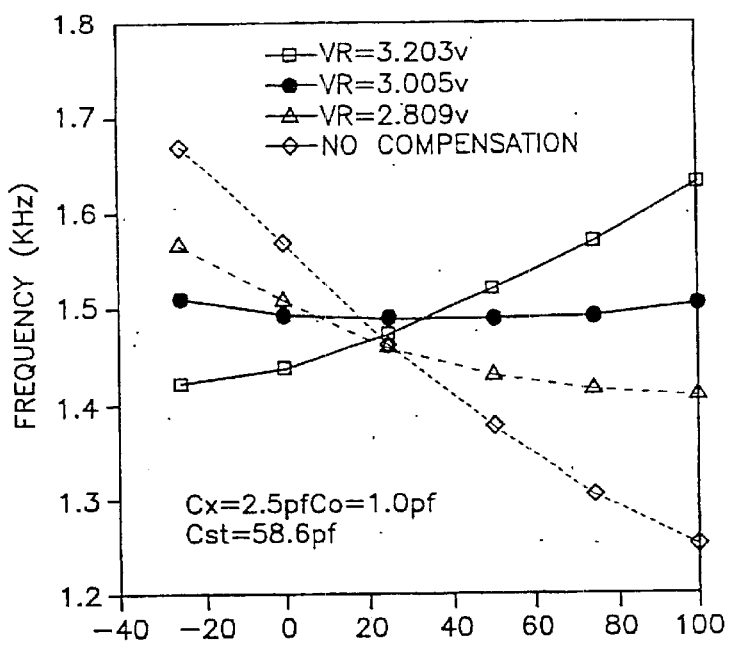
Figure 18A:
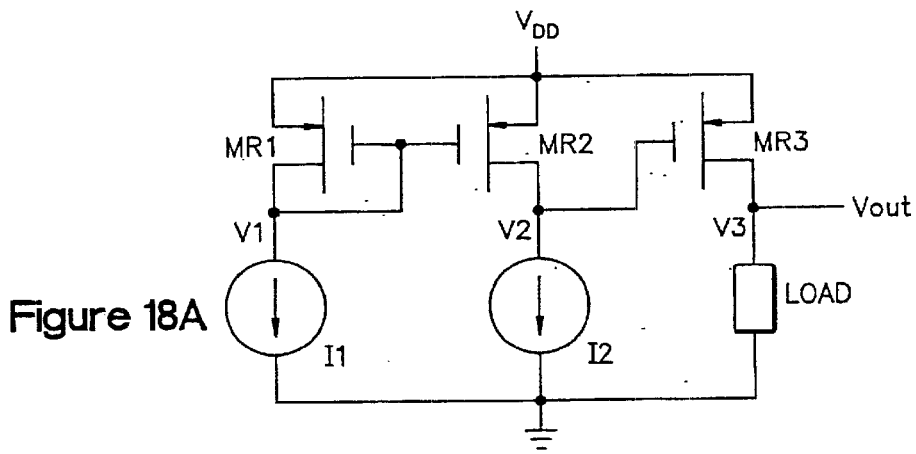
Figure 18B:
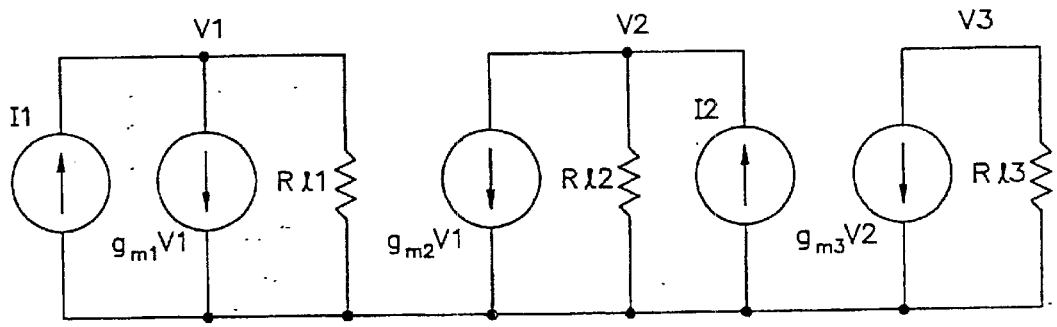
Figure 19:
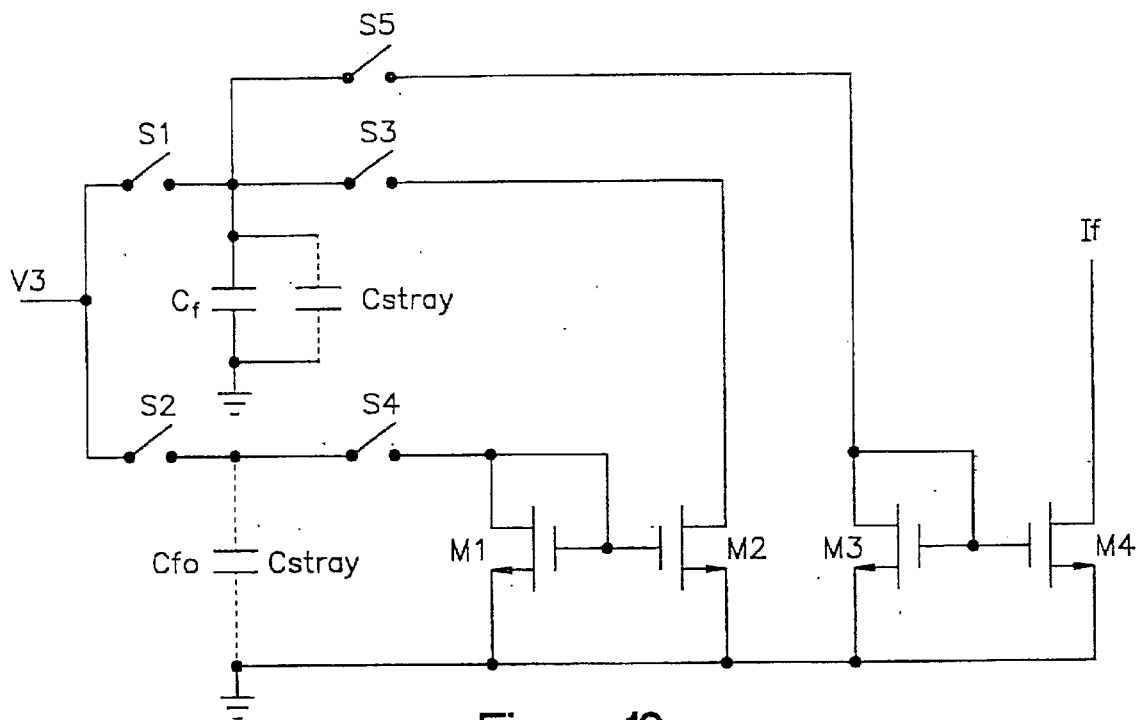
Figure 20:
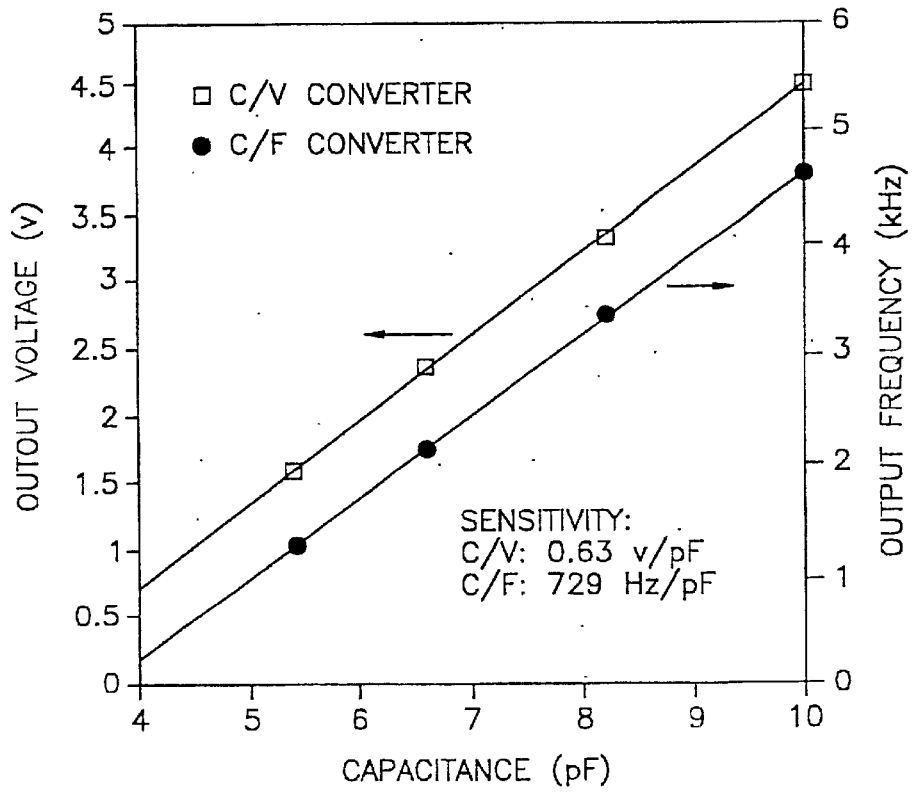

The structure, operation, and advantages of the present preferred embodiment of the invention will become further apparent upon consideration of the following description taken in conjunction with the accompanying drawings, wherein:

FIG. 1 is a block diagram of an embodiment of a Dual Output Capacitance Interface Circuit ("interface circuit"), according to the invention;

FIGS. 2, 3 and 4 are simplified schematics illustrating the operation and an implementation of a capacitance-to-current converter sub-circuit of the interface circuit illustrated in FIG. 1, according to the invention;

FIG. 5A is a simplified schematics illustrating the operation and an implementation of a current-to-frequency (I-F) converter sub-circuit of the interface circuit illustrated in FIG. 1, according to the invention;

FIG. 5B is a wave form diagram for the current-to-frequency converter, according to the invention;

FIG. 6 is a schematic for a configuration of a CMOS Schmitt trigger circuit, according to the invention;

FIG. 7 is a state diagram of a three-phase clock generator sub-circuit of the interface circuit illustrated in FIG. 1, according to the invention;

FIG. 8 is a true value table for the three-phase clock generator sub-circuit of the interface circuit illustrated in FIG. 1, according to the invention;

FIG. 9 is a schematic of an implementation of the three-phase clock generator sub-circuit of the interface circuit illustrated in FIG. 1, according to the invention;

FIG. 10 is a schematic of a Schmitt oscillator (input clock generator) for providing a high duty cycle pulse for the three-phase clock generator sub-circuit of FIG. 9, according to the invention;

FIG. 11 is a timing diagram for the three-phase clock generator sub-circuit of FIG. 9 and the Schmitt oscillator of FIG. 10, according to the invention, FIG. 12 is a graph showing a Pspice-simulated resolution of a C-F converter, according to the invention;

FIG. 13 is a graph showing a Pspice-simulated temperature characteristic of a threshold voltage for a Schmitt trigger, according to the invention;

FIGS. 14A and 14B are graphs showing simulated drain current temperature characteristics for a pMOS, at Vgs=0 v and Vgx=1.8115 v, respectively, according to the invention;

FIG. 15 is a simplified schematic of a modified clock generator with temperature compensation, according to the invention;

FIG. 16 is a graph showing a Pspice-simulated temperature characteristic of a clock generator with temperature compensation, according to the invention;

FIG. 17 is a graph showing temperature characteristics of a C-F converter without temperature compensation, according to the invention;

FIG. 18A is a simplified schematic showing a current difference-to-voltage converter, according to the invention;

FIG. 18B is simplified schematic of a small signal equivalent circuit for a current difference-to-voltage converter, according to the invention;

FIG. 19 is a simplified schematic of a reference current generator for a current difference-to-voltage converter, according to the invention; and FIG. 20 is a graph illustrating characteristics of the dual output converter of the present invention.

DETAILED DESCRIPTION OF THE INVENTION

FIG. 1 is a block diagram of an embodiment of the Dual Output Capacitance Interface Circuit ("interface circuit") 100 of the present invention. Generally, the circuit 100 has an input 102, to which is connected a variable capacitance (Cx), and has two outputs—a voltage output 104 and a frequency output 106, both of which vary according to the value of the capacitance (Cx) on the input 102 of the interface circuit 100. The interface circuit 100 comprises four major functional blocks (sub-circuits):

a capacitance-to-current (C-I) converter 110 (capacitor-controlled current source) which converts the measured capacitance (Cx) to a current signal;

a current-to-frequency (I-F) converter 112 which is used to convert the current from the C-I converter 110 to a frequency signal on the output 106;

a current-to-voltage (I-V) converter 114 (followed by a buffer 115) which is used to convert the current from the C-I converter 110 to a DC voltage signal on the output 104; and a three-phase clock generator 116, driven by an oscillator 118 controlled by a capacitor (Cosc), which provides a three-phase non-overlapping clock to control the charging/discharging process of the capacitance-to-current (C-I) converter 110. No reset is necessary to initiate the three-phase clock. The transition of the states is designed to avoid any simultaneous high state of the three phases.

Capacitance-to-Current (C-I) Converter

FIGS. 2, 3 and 4 are simplified schematics illustrating the operation and an implementation of the capacitance-to-current (C-I) converter 110 of FIG. 1.

A modified switched-capacitor emulated resistor may be used to implement the capacitor controlled current source, and is shown in FIG. 2. Switches $S_1$ and $S_2$ are controlled by a non-overlapping two-phase clock (not shown). During phase 1, switch $S_1$ is closed and switch $S_2$ is opened. The capacitor, C, is charged to $V_1$ at the end of phase 1. The charge on the capacitor C is $CV_1$ During phase 2, the switch $S_1$ is opened and the switch $S_2$ is closed. The charge on the capacitor C will become $Q=CV_2$ at the end of phase 2. The net charge transferred in one clock cycle is $CV_1-CV_2$. If the process continues, the average current flowing between $V_1$ and $V_2$ is $(CV_1-CV_2)f=(V_1-V_2)fC$, where $f$ is the cycling clock frequency. The equivalent resistance between $V_1$ and $V_2$ is $1/fC$. By replacing $V_2$ with a MOSFET transistor. $M_1$, as shown in FIG. 3, the average current flow through the transistor $M_1$ is $(V_1-V_T)fC$, where $V_T$ is the threshold voltage of the MOSFET providing the adequate settling time is allowed. Since transistors $M_1$ and $M_2$ are connected as a current mirror, the current flowing through $M_2$ will be the same as the current flowing through $M_1$ (ignoring a finite output resistance for $M_2$).

The capacitance-to-current (C-I) converter 110 can be constructed by three capacitor controlled current sources as shown in FIG. 4. The circuit is controlled by a three-phase non-overlapping clock (116). In phase 1, switches $S_1$ and $S_2$ are closed. Capacitors $C_x$ and $C_o$ are charged to voltages $V_g$ and $V_o$, respectively. In phase 2, the switches $S_3$ and $S_4$ are closed. The charge in the capacitor $C_o$ is discharged through the transistor $M_1$. The same amount of charge will be drawn from the capacitor $C_x$ through the transistor $M_2$ in the same time period when the capacitor $C_o$ is discharged, providing that the transistor $M_2$ remains saturated. The charge left on the capacitor $C_x$ at the end of phase 2 is $Q=V_g C_x-(V_o-V_T) C_o$, assuming that the charge, $V_g C_x$, is larger than the charge, $(V_o-V_T)C_o$. The remaining voltage across the capacitor $C_x$ is $Q/C_x=V_g-(V_o-V_T)(C_o/C_x)$. During phase 3, the switch $S_5$ is closed, and the average current flowing through the transistor $M_3$ is:

$$\begin{aligned} I &= [V_g - (V_o - V_T)C_o/C_x - V_T]fC_x \\ &= [(V_g - V_T)C_x - (V_o - V_T)C_o]f \\ &= f(V_g - V_T)C_x - f(V_o - V_T)C_o \\ &= K_1 C_x - K_2 C_o \\ &= K1 C_x - K_3 \end{aligned} \quad \text{(Eqn. 1)}$$

where $K_1=f(V_g-V_T)$, $K_2=f(V_o-V_T)$, $K_3=f(V_o-V_T)C_o$, assuming that threshold voltages of the transistors $M_1$, $M_2$ and $M_3$ are the same.

Hence, the current I, flowing through the transistor. $M_3$ is related to (a measure of) the capacitance $C_x$. The current I is also related to both $fV_g$ and $fV_o C_o$, which makes it possible to adjust the current by two external parameters, $V_g$ and $V_o C_o$, independently. The $V_o C_o$ is used to adjust reference or offset current, while $V_g$ is used for gain control of C-I converter 110.

Current-to-Frequency (I-F) Converter

FIGS. 5A, 5B and 6 illustrate the operation and an implementation of the current-to-frequency (I-F) converter 112 of FIG. 1.

FIG. 5A is a simplified schematic illustrating the operation and an implementation of the current-to-frequency (I-F) converter 112 of FIG. 1. An output portion of the C-I converter 110, including the transistors $M_3$ and $M_4$ is shown to the left of a dashed line. The current-to-frequency (I-F) components are shown to the right of the dashed line.

A Schmitt trigger is used to implement current-to-frequency (I-F) conversion. The Schmitt trigger has two trigger points, i.e., high threshold voltage, $V_H$, and low threshold voltage, $V_L$. If the input voltage of a Schmitt trigger varies from low to high, the output voltage will change from high to low when the input reaches the high threshold voltage. If the input voltage varies from high to low, the output voltage will change from low to high when the input reaches the low threshold voltage. The input voltage of the Schmitt trigger in the I-F converter is the voltage on a capacitor, $C_{st}$, which is charged by a current source. Using average current I in equation Eqn. 1, which is related to the capacitance $C_x$ measured, to charge and discharge the capacitor $C_{st}$, a symmetric square wave can be obtained from the output of the Schmitt trigger, as shown in the graphs of FIG. 5B. The charge current source and the discharge sink can be realized by two current mirrors controlled by two switches, as shown in FIG. 5A. The transistors $M_{f1}$, $M_{f2}$ and the switch $S_{11}$ are used to generate the charging current. When the voltage on the capacitor $C_{st}$ is less than the high threshold voltage, $V_H$, the output of the Schmitt trigger is high, thus the output $F_{out}$ is low. Using the high output signal of the Schmitt trigger to turn on the switch $S_{11}$ on, the current through the transistor $M_{f2}$, which is equal to the current I, will charge the capacitor $C_{st}$ until the voltage on the capacitor $C_{st}$ reaches the $V_H$. At this time, the Schmitt trigger toggles. The output of the Schmitt trigger becomes low and the output $F_{out}$ becomes high. Using the output signal $F_{out}$ to turn on the switch $S_{12}$, the capacitor $C_{st}$ is discharged through the transistor $M_{f4/3}$. The discharging current is also the mirrored current, I. The charging and discharging time are the same, which is equal to $V_c C_{st}/I$. Thus, the output frequency, $F_{out}$, can be expressed as:

$$F_{out} = \frac{I}{2V_c C_{st}} = \frac{(V_g - V_T)C_x - (V_o - V_T)C_o}{2V_c C_{st}} f \quad \text{(Eqn. 2)}$$

where $V_c$ is the threshold voltage of the Schmitt trigger, which is the difference between $V_H$ and $V_L$.

The CMOS Schmitt trigger is suitably constructed by six CMOS transistors MS1, MS2, MS3, MS4, MS5 and MS6, as shown in FIG. 6. Assuming that the input voltage $V_{in}$ is zero. then transistors MS1 and MS2 are off, transistors MS4 and MS5 are in the linear mode of operation, but the voltage drops at each transistor are zero because there is no current following. The output voltage is $V_{DD}$. Transistor MS3 is on at this time. Therefore it also does not carry current since $V_n=V_{DD}$. When $V_{in}$ rises above the threshold voltage of nMOS, transistor MS1 turns on and starts to conduct. The potential $V_n$, which is the source-drain voltage of transistor MS1, is starting to decrease with the gate voltage $V_{in}$ increasing. The trigger operation starts when $V_{in}$ reaches the value $V_{Hi}$. At this point, due to the simultaneous increase of $V_{in}$ and decrease of $V_n$, the transistor MS2 turns on. The trigger starts to operate as a linear circuit with positive feedback. Thus the transition from high to low is very fast. The same situation happens when the $V_{in}$ varies from high to low. The $V_{Hi}$ and $V_{Li}$ can be obtained from the equations shown as follows:

$$\frac{k1}{k3} = \left(\frac{V_{DD} - V_{Hi}}{V_{Hi} - V_{m)}}\right)^2 \text{ thus} \quad \text{(Eqn. 3)}$$

$$V_{Hi} = \frac{V_{DD} + \sqrt{\frac{k1}{k3}} V_{Tn}}{1 + \sqrt{\frac{k1}{k3}}} \quad \text{(Eqn. 4)}$$

$$\frac{k4}{k6} = \left(\frac{V_{Li}}{V_{DD} - V_{Li} - |V_{TP}|}\right)^2 \text{ thus,} \quad \text{(Eqn. 5)}$$

$$V_{Li} = \frac{V_{DD} - |V_{Tp}|}{1 + \sqrt{\frac{k4}{k6}}} \sqrt{\frac{k4}{k6}} \quad \text{(Eqn. 6)}$$

where ki (i=1–4) are the width length ratio of MOSFETs; $V_{DD}$ is power supply; $V_{Tn}$ and $V_{Tp}$ are the threshold voltage of nMOS and pMOS, respectively.

The two equations Eqn. 4 and Eqn. 6 can be used to determine the high threshold voltage and low threshold voltage of the Schrnitt trigger. On the other hand, these two equations can also be used to design transistors' sizes to get threshold voltages required.

The voltages $V_{Hi}$ and $V_{Li}$ are, in fact, the beginning of triggering operation. The real triggering occurs at approximate but different voltage $V_H$ and $V_L$. The difference depends on choice of the parameters k2 and k5 and can be estimated as follows:

$$\Delta V_H = V_H - V_{Hi} = \frac{V_{DD} - V_{Hi} - |V_{Tp}|}{\frac{k_2}{k_5} + \frac{k_2}{k_4}} \quad \text{(Eqn. 7)}$$

-continued $$\Delta V_L = V_L - V_{Li} = -\frac{V_{Li} - V_{Tn}}{\frac{k_5}{k_2} + \frac{k_5}{k_1}} \quad \text{(Eqn. 8)}$$

where ki (i=1, 2, ..., 5) are the width:length ratios of the MOSFET transistors MS1–MS6. In this example: the transistor MS1 has a width:length ratio of 18:2 (6/2), the transistor MS2 has a width:length ratio of 18:2 (18/2), the transistor MS3 has a width:length ratio of 18:2 (21/2), the transistor MS4 has a width:length ratio of 18:2 (18/2), the transistor MS5 has a width:length ratio of 18:2 (90/2), and the transistor MS6 has a width:length ratio of 18:2 (36/2).

It can be seen from the equations above that to reduce $\Delta V_H$ and $\Delta V_L$, the k2/k5 should be kept constant and both k2/k4 and k5/k1 should be increased.

Assume that a Schmitt trigger has threshold values of $V_{Hi}$=3.5 v and $V_{Li}$=1.7 v. The circuit operates at $V_{DD}$=5 v. Using MOSIS process parameters $\mu_n C_{ox}/2$=26.5, $\mu_p C_{ox}/2$= 9.6, $V_{Tn}$=0.7412, $V_{Tp}$=−0.9002 [4.7] and equations Eqn. 4–Eqn. 8, the Schmitt trigger is designed. The sizes of transistors (W/L) are marked in FIG. 6. The calculated (from equation 4.4–4.8), Pspice simulated and measured threshold voltages are listed in the following table (TABLE 1).

TABLE 1

| Parameters of Schmitt trigger | | | |
|---|---|---|---|
| | Calculation | Simulation | Measurement |
| $V_{Hi}$ (v) | 3.516 | N/A | N/A |
| $V_H = V_{Hi} + \Delta V_H$ (v) | 3.692 | 3.736 | 3.682 |
| $V_{Li}$ (v) | 1.698 | N/A | N/A |
| $V_H = V_{Li} + \Delta V_L$ (v) | 1.566 | 1.528 | 1.586 |
| Fall time (ns) | N/A | 21.58 | N/A |
| Rise time (ns) | N/A | 28.59 | N/A |

Three-Phase Clock

FIG. 7 is a state diagram, FIG. 8 is a true value table and FIG. 9 is a schematic of an implementation of the three-phase clock generator 116 of FIG. 1. FIG. 10 is a schematic of a Schmitt oscillator (input clock generator) for providing a high duty cycle pulse for the three-phase clock generator of FIG. 9. FIG. 11 is a timing diagram for the three-phase, non-overlapping clock generator of FIG. 9 and the Schmitt oscillator of FIG. 10.

A three-phase non-overlapping clock is employed in the capacitance-to-frequency converter (the combination of the C-I converter 110 and the I-F converter 112 comprise a capacitance-to-frequency (C-F) converter "110/112") to control charging and discharging capacitors in different periods of time, as discussed hereinabove. The required state diagram of the clock is shown in FIG. 7. Each state represents one combination of the three phases of the clock. Each logic number represents the voltage level of a phase in the clock. A true value table can be obtained from the state diagram, as shown in FIG. 8. wherein Q1, Q2 and Q3 are the three phases of the clock. The clock preferably has "anti-lock" property, meaning that whatever state each phase of the clock has initially, the clock should be working properly in the right transition sequence. The symbol "x" in the true value table of FIG. 8 represents a "don't care" phase. Since the faulty states are those states which have more than one "1" output in the clock. If the clock is in one of those faulty states, the next state needs to be one of the states which have only one "1", or initial state (0 0 0). Therefore, the faulty state (0 11) should go to any one of the states (0 0 0), (0 1 0), (1 0 0) and (0 0 1), for example. But only one "don't care" phase is allowed for one faulty state in the true value table in order to avoid going to another faulty state. By adding "don't care" phases on proper places, logic equations of the clock can be simplified. If the clock is not allowed to go to state (1 0 0) from the faulty state (0 1 1), the phase 1 must be follow the equation $$Q_{1n} = \overline{Q_{1(n-1)}} Q_{2(n-1)} \overline{Q_{3(n-1)}} \quad \text{(Eqn. 9)}$$

However, if the clock can go to state (1 0 0) also, the logic equation can be simplified as:

$$Q_{1n} = \overline{Q_{1(n-1)}} Q_{2(n-1)} \overline{Q_{3(n-1)}} + \overline{Q_{1(n-1)}} Q_{2(n-1)} Q_{3(n-1)} \quad \text{(Eqn. 9.1)}$$

$$= \overline{Q_{1(n-1)}} Q_{2(n-1)}$$

Using the same method, the logic equations for phases 2 and 3 can be obtained as $$Q_{2n} = \overline{Q_{1(n-1)} Q_{2(n-1)}} \quad \text{(Eqn. 9.2)}$$

$$Q_{3n} = Q_{1(n-1)} \overline{Q_{2(n-1)}} \quad \text{(Eqn. 9.3)}$$

The "don't care" phases are added in the true value table as shown in FIG. 8.

Two three-phase non-overlapping clock 116 can be constructed according to equations set forth above. An embodiment of a physical implementation (realization) for the clock is shown in FIG. 9. A high duty cycle clock is used as an input clock of the three-phase clock. Two edge-trigged D flip-flops are used to control the transition timing. Since the transition of D flip-flops occurs at the rising edge of the input clock, there will be no undesirable spike to cause erroneous turn-on of switches. The low period of input clock pulls all the outputs low, which produces the non-overlapping period between adjacent phases. Since the clock generator has "anti-lock" property, no reset is necessary to initiate the clock.

FIG. 10 illustrates a Schmitt oscillator (clock generator) for providing a high duty cycle pulse for the three-phase clock generator of FIG. 9. The low period will be used to produce the non-overlapping period. The high period is converted to the high period of each phase of the three-phase clock by the sequence desired. The charging and discharging of the capacitor $C_{osc}$ is achieved by a non-symmetric inverter whose pMOS has a lower driving capacity than that of nMOS, so that $C_{osc}$ can be charged slowly up to the high threshold voltage of the Schmitt trigger to provide a long positive period of the pulse. FIG. 11 illustrates the schematic timing diagram of the Schmitt trigger input clock generator of FIG. 10 and the three-phase non-overlapping clock generator of FIG. 9. The ratio of $(W/L)_p/(W/L)_n$ is 3/10. which will give the nMOS about 10 times driving power than the pMOS considering $\mu_n \approx 3\mu_p$. Therefore, the duty cycle of the clock is 90.9%.

Conversion of Capacitance-to-current

The conversion of capacitance-to-current is realized by the charge difference on the measuring capacitor and the reference capacitor. The charging and discharging process are important in the conversion, especially the discharging process since it controls the total charge which can be converted to current. To simplify the discharging process analysis, the resistance of the analog switch is represented by a linear resistor, R. When the voltage $V_{DS}$ of a MOSFET is greater than the saturation voltage which is $V_{GS}-V_T$, the MOSFET works in the saturation region. The first-order expression of the drain current can be expressed as:

$$I = k'(V_G - V_T)^2 \quad \text{(Eqn. 10)}$$

$$\text{where } k' = \frac{\mu C_{ox}}{2} \frac{W}{L}$$

The gate voltage $V_G$ can be expressed using saturation current by $$V_G = \sqrt{\frac{I}{k'}} + V_T \quad \text{(Eqn. 11)}$$

By Kirchoff's law, we have $$V_C = IR + V_G = IR + \sqrt{\frac{I}{k'}} + V_T \quad \text{(Eqn. 12.1)}$$

taking time derivative of both sides and substitute $\sqrt{I}$ with Y, $$\frac{dV_C}{dt} = 2RY\frac{dY}{dt} + \frac{1}{\sqrt{k'}}\frac{dY}{dt} \quad \text{(Eqn. 12.2)}$$

substitute $$\frac{dV_C}{dt}$$

using the equation $$I = -C\frac{dV_C}{dt},$$

$$-\frac{Y^2}{C} = 2RY\frac{dY}{dt} + \frac{1}{\sqrt{k'}}\frac{dY}{dt} \quad \text{(Eqn. 12.3)}$$

$$dt = -2RC\frac{dY}{Y} - \frac{C}{\sqrt{k'}}\frac{dY}{Y^2} \quad \text{(Eqn. 13)}$$

integrating both sides from 0 to t.

$$t = \frac{C}{\sqrt{k'}}\left(\frac{1}{Y} - \frac{1}{Y_0}\right) + 2RC\ln\frac{Y_0}{Y} \quad \text{(Eqn.14)}$$

$$= \frac{C}{\sqrt{k'}}\left(\frac{1}{\sqrt{I}} - \frac{1}{\sqrt{I_0}}\right) + 2RC\ln\frac{\sqrt{I_0}}{\sqrt{I}}$$

$$= \frac{C}{k'}\left(\frac{1}{V - V_T} - \frac{1}{V_i - V_T}\right) + 2RC\ln\frac{V_i - V_T}{V - V_T}$$

The time, t, is the time required for the gate voltage started at $V_i$ to drop to V. It can be observed that R has to be made small and k' be large in order to reduce the discharging time, t.

It is impractical to use low frequency in the capacitance-to-current converter to discharge the voltage on the capacitor to $V_T$. Based on the fact that the rate at which the voltage on the capacitor drops is slow when the gate voltage is close to the threshold voltage [4.10], the proper operation frequency can be chosen to obtain a satisfied accuracy. Ideally, the total charge which is used in the conversion is $(V_g - V_T)C_x$, assuming the voltage on the capacitor $C_x$ has been discharged from $V_g$ to $V_T$ during the discharging process. If the discharging time is not long enough, there is a residual voltage $\Delta V$, which differs from $V_T$ existed on $C_x$. The charge is used in the conversion now is $[V_g - (V_T + \Delta V)]C_x = [V_g - \Delta V - V_T]C_x$, where $\Delta V$ is the residual voltage. The residual voltage during the discharging process can be considered as a decreased charging voltage $V_g$. The output frequency error, because of the decreased $V_g$ can be derived as following:

Take derivative of Eqn. 2 respect to $V_g$ $$\frac{\partial F}{\partial V_g} = \frac{\frac{\partial I}{\partial V_g}}{2V_cC_{st}} = \frac{fC_x}{2V_cC_{st}} \quad \text{(Eqn. 16.1)}$$

$$\partial F = -\frac{fC_x}{2V_cC_{st}}\partial V_g \quad \text{(Eqn. 16.2)}$$

$$\frac{\partial F}{F} = \frac{C_x \partial V_g}{(V_g - V_T)C_x - (V_o - V_T)C_0} \quad \text{(Eqn. 16.3)}$$

The allowed variation of the charging voltage $V_g$ is dependent on the accuracy of the output required frequency. From equation Eqn. 16.3, we have:

$$\partial V_g = \frac{\partial F}{F}\frac{(V_g - V_T)C_x - (V_o - V_T)C_o}{C_x} \quad \text{(Eqn. 17)}$$

According to equation Eqn. 17, the maximum residual voltage $\Delta V$ on the capacitor before the voltage is discharged to $V_T$ can be determined. For an example, if the maximum error of output frequency is allowed to be 0.1% in the measurement range of 10 pF. $V_g = V_o = 4.5$ v, $C_f = 1.0$ pF. The residual voltage can be allowed to be 3.24 mv. Using equation Eqn. 14, the discharging time can be obtained when the $V - V_T$ is substituted by the residual voltage. Therefore, the operation frequency can be determined by the calculated discharging time. The clock frequency can be expressed in term of discharging time:

$$f = \frac{1}{3T_{dis} + 2T_{non-overlap}} \quad \text{(Eqn. 18)}$$

Other techniques to reduce $\Delta V$ can be developed so that the clock frequency can be increased.

Resolution of the C-F Converter

The resolution of the C-F converter 110/112 is defined as the minimum capacitance that the converter can detect. If the same voltage are used for $V_g$ and $V_o$, output frequency F in equation Eqn. 2 can be simplified as:

$$F = \frac{(V_g - V_T)(C_x - C_o)f}{2V_cC_{st}} \quad \text{(Eqn. 19.1)}$$

When the measured capacitance $C_x$ is increased by $\Delta C$, the output frequency F $\Delta C$ can be obtained as:

$$F_{\Delta C} = \frac{(V_g - V_T)(C_x + \Delta C - C_o)f}{2V_cC_{st}} \quad \text{(Eqn. 19.2)}$$

The difference of output frequency is:

$$\Delta F = F_{\Delta c} - F = \frac{(V_g - V_T)f\Delta C}{2V_cC_{st}} \quad \text{(Eqn. 19.3)}$$

The resolution of the converter can be expressed as:

$$\Delta C = \frac{\Delta F}{f} \frac{2V_c C_{st}}{V_g - V_T} \quad \text{(Eqn. 20)}$$

In the equation Eqn. 19, $V_c$ is the threshold voltage of the Schmitt trigger and cannot be adjusted due to circuit configuration. However, the resolution of the converter, $\Delta C$, can be designed by choosing the ratio of $C_{st}/fV_g$ under the condition that $\Delta F$ is greater than 1 Hz which is determined by the external measurement instrument. FIG. 12 shows that the resolution of the C-F converter (110/112) can be 0.01 pF when the parameters of the circuit listed are chosen.

Temperature Characteristics Analysis

Temperature characteristics of the C-F converter 110/112 are discussed in this section in order to understand the temperature drift of the circuit. The temperature sensitivity of all three sub-circuits, capacitance-to-current converter 110, current-to-frequency converter 112 and clock generator 116, contribute to the temperature error of the C-F converter 110/112.

(a) Temperature Dependency of MOSFET Threshold Voltage, $V_T$

The threshold voltage of MOS transistors is sensitive to temperature. It will introduce temperature drift of the CMOS based circuits. The parameter $\Phi_F$ plays a dominant role in the temperature dependency of the threshold voltage of MOS transistors. The temperature dependency $\Phi_F$ is given by:

$$\frac{d\Phi_F}{dT} = \frac{1}{T}\left[\Phi_F \pm \left(\frac{3}{2}\frac{kT}{q}\right)\frac{E_{g0}}{2q}\right] \quad \text{(Eqn. 20)}$$

in which "−" is used for an nMOS and "+" for a pMOS.

The parameter $\Phi_F$ always decreases in absolute value when the temperature increases. The term $E_{g_o}$ is dominant. As a result, for an nMOS, $\Phi_F$ is positive and its $d\Phi_F/dT$ is negative. Since the nMOS is usually in the enhancement mode, its threshold voltage decreases in absolute value. On the other hand, for a pMOS, $\Phi_F$ is negative and $d\Phi_F/dT$ is positive. The threshold voltage thus decreases in absolute value as well.

The temperature dependency of $V_T$ can be given by $$\frac{dV_T}{dT} = 2 \pm \frac{\gamma}{2\sqrt{|\Phi_F|}} \frac{d\Phi_F}{dT} \quad \text{(Eqn. 21)}$$

with "+" for a nMOS and "−" for a pMOS.

For a nMOS, the $$\frac{\partial V_T}{\partial T}$$

is negative and for a pMOS the $$\frac{\partial V_T}{\partial T}$$

is positive. But the absolute value of $$\frac{\partial V_T}{\partial T}$$

can be estimated as 2 mv/K.

(b) Temperature Dependency of Capacitance-to-current Converter

The temperature error of the C/I converter 110 comes from the threshold voltage of MOSFETs in current mirrors which are temperature dependent. From the equation Eqn. 1, the temperature error of the current converted can be expressed as:

$$\frac{\partial I}{\partial T} = \quad \text{(Eqn. 22)}$$

$$\left(-C_x \frac{\partial V_T}{\partial T} + C_o \frac{\partial V_T}{\partial T}\right)f + [(V_g - V_T)C_x - (V_o - V_T)C_o]\frac{\partial f}{\partial T} =$$

$$-\frac{\partial V_T}{\partial T}(C_x - C_o)f + [(V_g - V_T)C_x - (V_o - V_T)C_o]\frac{\partial f}{\partial T}$$

The temperature error of the current is proportional to the temperature drift of the threshold voltage and clock frequency.

(c) Temperature Dependency of Schmitt Trigger Circuit

The current-to-frequency converter and the clock generator are realized by the Schmitt trigger circuits. The temperature characteristics of the two sub-circuits are determined by the temperature dependency of the Schmitt trigger.

Using equations Eqn. 4 and Eqn. 6 the threshold voltage can be defined as $$V_c = V_H - V_L = \frac{V_{DD} + \sqrt{\frac{k1}{k3}} V_{Tn}}{1 + \sqrt{\frac{k1}{k3}}} - \frac{V_{DD} - |V_{Tp}|}{1 + \sqrt{\frac{k4}{k6}}}\sqrt{\frac{k4}{k6}} \quad \text{(Eqn. 23)}$$

The temperature error of Schmitt trigger is:

$$\frac{\partial V_c}{\partial T} = \frac{\sqrt{\frac{k1}{k3}}}{1 + \sqrt{\frac{k1}{k3}}} \frac{\partial V_{Tn}}{\partial T} + \frac{\sqrt{\frac{k4}{k6}}}{1 + \sqrt{\frac{k4}{k6}}} \frac{\partial |V_{Tp}|}{\partial T} \quad \text{(Eqn. 24)}$$

The temperature error of the Schmnitt trigger is proportional to the error of the threshold voltages of both pMOS and nMOS. The temperature drift can be determined as −1.525 mv/K according to equation Eqn. 24, where k1/k3= 6/21 and k4/k6=18/36. FIG. 13 shows a Pspice simulation result of the temperature characteristics of the threshold voltage of the Schmitt trigger circuit used in the converter.

(d) Temperature Error of the capacitance-to-frequency Converter

The temperature error of the capacitance-to-frequency converter 110/112 comes from three major sub-circuits, the capacitance-to-current converter 110, Schmitt trigger (FIG. 10) and clock generator 116. The output frequency is given by:

$$F = \frac{I}{2V_c C_{st}} \quad \text{(Eqn. 25)}$$

-continued $$\frac{\partial F}{\partial T} = \frac{1}{2V_c C_{st}} \frac{\partial I}{\partial T} - \frac{I}{2V_c^2 C_{st}} \frac{\partial V_c}{\partial T} \quad \text{(Eqn. 26)}$$

$$= \frac{1}{2V_c C_{st}} \left\{ -\frac{\partial V_{Tn}}{\partial T}(C_x - C_o)f + \right.$$

$$\left. [(V_g - V_{Tn})C_x - (V_o - V_{Tn})C_o] \frac{\partial f}{\partial T} - \frac{1}{V_c} \frac{\partial V_c}{\partial T} \right\}$$

$$= -\frac{f}{2V_c C_{st}} \left[ (C_x - C_o) \frac{\partial V_{Tn}}{\partial T} + \right.$$

$$\left. \frac{(V_g - V_{Tn})C_x - (V_o - V_{Tn})C_o}{V_c} \frac{\partial V_c}{\partial T} \right] +$$

$$\frac{(V_g - V_{Tn})C_x - (V_o - V_{Tn})C_o}{2V_c C_{st}} \frac{\partial f}{\partial T}$$

As discussed before, both the threshold voltage of a nMOS and the threshold voltage of a Schmitt trigger have negative temperature coefficients. It can be noticed from equation Eqn. 26 that the $\partial V_T/\partial T$ and $\partial V_c/\partial T$ have opposite signs with $\partial f/\partial T$. Therefore, the temperature error of the C/F converter circuit can be compensated if the clock frequency has an appropriate negative temperature coefficient. A temperature compensation method based on the temperature controlled saturation current of pMOS transistors is discussed in the following section.

Temperature Error Compensation for C-F Converter

For a MOSFET in saturation, the first-order expression of the drain current can be expressed as:

$$I_{sat} = \frac{\mu C_{ox}}{2} \frac{W}{L}(V_{GS} - V_T)^2 \quad \text{(Eqn. 27)}$$

The temperature coefficient of the saturation current is determined by the temperature coefficient of both mobility of carriers in the inversion layer and the threshold voltage, $V_T$, of the MOSFET. The mobility of holes and electrons can be a strong function of temperature, depending on the doping level, given by $\mu = C_\mu T^{-n_\mu}$ where $C_\mu$ and $n_\mu$ are constants. The temperature dependency of the mobility itself is then given by;

$$\frac{1}{\mu} \frac{d\mu}{dT} = -\frac{n_u}{T} \quad \text{(Eqn. 28)}$$

For low doping levels, the value of $n_\mu$ is about 1.5. The channel of a MOSFET has an average doping level that is at least the doping level of bulk (i.e. strong inversion condition). Therefore, the bulk doping level can be used to estimate the value of $n_\mu$. The result usually is close to 1.5.

Take time derivative to equation Eqn.27, $$\frac{\partial I_{sat}}{\partial T} = \frac{C_{ox}}{2} \frac{W}{L}(V_{GS} - V_T)^2 \frac{\partial \mu}{\partial T} - \frac{\mu C_{ox}}{2} \frac{W}{L} 2(V_{GS} - V_T) \frac{\partial V_T}{\partial T} \quad \text{(Eqn. 29.1)}$$

Dividing $I_{sat}$ on both sides, $$\frac{1}{I_{sat}} \frac{\partial I_{sat}}{\partial T} = \frac{1}{\mu} \frac{\partial \mu}{\partial T} - \frac{2}{V_{Gs} - V_T} \frac{\partial V_T}{\partial T} \quad \text{(Eqn. 29.2)}$$

Substituting equation Eqn. 28 into equation Eqn. 29.2, $$\frac{1}{I_{sat}} \frac{\partial I_{sat}}{\partial T} = -\frac{n_\mu}{T} - \frac{2}{V_{GS} - V_T} \frac{\partial V_T}{\partial T} \quad \text{(Eqn. 30)}$$

The two terms have different signs and can be compensating each other. It can be shown, theoretically and experimentally, that unique (and distinct) gate voltage exists for a given MOSFET that the drain current has a zero temperature coefficient.

Letting $$\frac{1}{I_{sat}} \frac{\partial I_{sat}}{\partial T} = 0,$$

the zero-temperature-coefficient gate-source voltage ($V_{GSZ}$) can be determined by:

$$V_{GSZ} = V_T - \frac{2T}{n_\mu} \left( \frac{\partial V_T}{\partial T} \right) \quad \text{(Eqn. 31)}$$

For a pMOS made by MOSIS, the $V_T$ is −0.9 v, using $n_\mu$=1.5, the zero temperature coefficient $V_{GS}$ can be estimated as −1.7 v at 300 K. FIGS. 14A and 14B show the drain current of a pMOS simulated by Pspice. Using $V_{GS}$=−5 v in (a), the drain current changes from 161.055 μA to 106.663 μA in the temperature range between 0 to 100° C. The maximum error is 33.77%. Using $V_{GS}$=−1.8115 v in (b), the transistor keeps the drain current of 11.779 μA at 0° C. and 100° C. The minimum drain current is 11.657 μA at 45° C. The maximum error is 1.035% with respect to the drain current at 0 ° C.

Using the principle discussed above, the clock generator used in the converter can be modified to have a controllable temperature characteristic. The diagram of the modified clock generator is shown in FIG. 15. As discussed hereinabove, the clock is realized by a Schmitt trigger. The input voltage of the Schmitt trigger is the voltage on the capacitor. $C_{st}$, charged and discharged by two MOSFETs. By biasing $M_1$ at $V_{GSZ}$, the charging current can be temperature stable. Since the charging time is the dominant factor determining the clock period in the high duty cycle clock, only the transistor $M_1$ is biased to have a zero temperature coefficient drain current to simplified the design. Transistor $S_c$ is used as a switch (hence, the "S" nomenclature) to control the charging process. When the output of the Schmitt trigger is low, the transistor $S_c$ is "on" to connect power supply with a resistor network which gives the $M_1$ a biasing gate voltage at $V_{GSZ}$. The capacitor $C_{st}$ is charged via the transistor $M_1$ to the high threshold voltage. When the output of the Schmitt trigger is high, transistors $S_c$ and $M_1$ are off. Then the $C_{st}$ is discharged via $M_2$ at the maximum saturation current to the lower threshold voltage. Actually, $M_1$ needs to be biased at $V_{GSZ}'$, where $|V_{GSZ}'|$ is greater than $|V_{GSZ}|$, so that it has a negative temperature coefficient in order to compensate the temperature errors of the threshold voltage of the Schmitt trigger and capacitance-to-current converter (see Eqn. 26). FIG. 16 shows the Pspice simulation results of a clock frequency in the temperature range of −25° C. to 100 ° C., where the M1 is biased at 1.818 v. The relative error with respect to the frequency at 25° C. is less than ±0.5%. FIG. 17 shows the output frequency of the capacitance-to-frequency converter when M1 is biased at different voltages. It can be shown that the temperature coefficient of the converter can vary from positive to negative depending on how the bias voltage of M1 is designed.

TABLE 2 shows the relative temperature error of the converter in the range of −25° C.–100° C., which is defined as following:

$$\varepsilon = \frac{F(T) - F(25° \text{ C.})}{F(25° \text{ C.})} \times 100\% \quad \text{(Eqn. 32)}$$

The simulated results were used to design the circuit of the capacitance-to-frequency/voltage converter.

TABLE 2

Relative Temperature Error of C-F Converter

| $V_R$ (v) | no compensation | 3.203 | 3.005 | 2.809 |
|---|---|---|---|---|
| Error % | +/−14.16 | +/−7.19 | +/−0.67 | +/−5.33 |

Capacitance-to-Voltage Converter

The current obtained from the capacitance-to-current (C-I) converter 110 can also be used to provide DC voltage signal output 104. A combination of the capacitance-to-current (C-I) converter 110 and current-to-voltage (I-V) converter 114 constitute a capacitance-to-voltage converter "110/114".

A difference current-to-voltage (I-V) converter 114 is shown in FIG. 18A. By using this circuit, a voltage output 104 can be obtained in addition to the frequency output 106 from the capacitance-to-frequency (C-F) converter 110/112. The equivalent small signal circuit of the V-I circuit is shown in FIG. 18B, where $g_{mi}$, and $r_{li}$ are the transconductance and loading resistance of the drain of the ith MOSFET, respectively. From the small signal circuit, we have, $$V1 = (I1 - g_{m1}V1)r_{l1} \quad \text{(Eqn. 32-1)}$$

$$V1 = \frac{r_{l1}I1}{1 + g_{m1}r_{l1}} \quad \text{(Eqn. 32-2)}$$

$$V2 = (I2 - g_{m2}V1)r_{l2} \quad \text{(Eqn. 33)}$$

$$V3 = g_{m3}V2r_{l3} \quad \text{(Eqn. 33)}$$
$$= (I2 - g_{m2}V1)r_{l2}g_{m3}r_{l3}$$
$$= \left(I2 - \frac{g_{m2}r_{l1}I1}{1 + g_{m1}r_{l1}}\right)r_{l2}g_{m3}r_{l3}$$

when $g_{m1} = g_{m2}$ and $g_{m1}r_{l1} \gg 1$, then we have $$V3 = r_{l2}g_{m3}r_{l3}(I2 - I1) \quad \text{(Eqn. 34)}$$
$$= R(I2 - I1)$$

where the equivalent resistance $R = r_{l2}g_{m3}r_{l3}$.

From the capacitance-to-frequency (C-F) converter 110/112, the current difference, $I_x - I_o$, has been obtained and can be used as one of the inputs of I-V circuit 114. I2 can be generated using a similar principle used in the C-F converter. Using a reference capacitor, Cƒ, and output voltage V3 of the I-V circuit 114 to construct current mirrors as shown in FIG. 19 (compare FIG. 4), the current I2 can be obtained as $$I_f = f(V3 - V_T)(C_f + C_{stray} - C_{stray}) = f(V3 - V_T)C_f \quad \text{(Eqn. 35)}$$

The reference capacitor Cƒ is also called a feedback capacitor since the current generated by Cƒ is related to the output voltage V3. In order to eliminate the effect of the stray capacitor connected to the Cƒ, one null capacitor is connected to one of the current mirrors which has the same routing as Cƒ. The V3 can be rewritten as:

$$V3 = R(I2 - I1) \quad \text{(Eqn. 36-1)}$$
$$= R(I_x - I_o - I_f)$$
$$= R(K1C_x - K2C_o - K3C_f)$$
$$= R[f(V_g - V_T)C_x - f(V_o - V_T)C_o - f(V3 - V_T)C_f]$$

$$V3 = \frac{Rf[(V_g - V_T)C_x - (V_o - V_T)C_o - V_TC_f]}{1 + RfC_f} \quad \text{(Eqn. 36-2)}$$

if $RfC_f \gg 1$ then $$V_{out} = V3 = \frac{(V_g - V_T)C_x - (V_o - V_T)C_o - V_TC_f}{C_f} \quad \text{(Eqn. 36-3)}$$

The output of the C-V converter 110/114 is independent of the clock frequency and the value of the equivalent resistor. The sensitivity of the converter is defined as:

$$S_{C_x} = \partial V / \partial C_x = (V_g - V_T)/C_f. \quad \text{(Eqn. 37)}$$

Thus, the sensitivity of the converter can be adjusted either by voltage $V_g$ or capacitor $C_f$.

FIG. 20 is a graph illustrating the frequency and voltage outputs of the dual output converter 100. Each of the C-F and C-V converters 110/112 and 110/114, respectively, are adjusted to have the best linear characteristics in the test range. The C/V converter is first adjusted by varying $V_o$ to get the offset voltage greater than 1.5 v. The span of the voltage output can be adjusted by changing the sensitivity of the circuit, normally by shunting the feedback capacitor, $C_f$. The frequency output can be adjusted by varying capacitor $C_{sp}$, as discussed hereinabove. As illustrated in FIG. 20, the sensitivity of the C/V converter is 0.63 v/pF with non-linearity ±0.38% and the sensitivity of the C/F converter is 729 Hz/pF with non-linearity of ±0.61%. The sensitivity of the C/V converter is lower than the designed value because of large stray capacitance of $C_f$.

A dual output capacitance interface circuit (100) based on switched capacitor circuits and charge subtraction technique provides both voltage output (104) and frequency output (106). The circuit is programmable independently with sensitivity and offset adjustment, and is insensitive to fixed stray capacitance. A sensitivity of 350 Hz/pF has been achieved in the 10 pF measurement range with non-linearity less that ±0.6%. A higher capacitance-to-frequency (C-F) sensitivity can be obtained for a smaller capacitance measurement range. A voltage sensitivity of 3–4 v/pF can be achieved. In the temperature range of 25° C.–95° C., the offset temperature drift of the C-V converter is less than 5%. The sensitivity drift is less than 3.5%. The offset temperature drift of the C-F converter is about −16% and the sensitivity drift is also −16% in the temperature range of 25° C.–95° C.

A temperature compensation method is based on the fact that a MOSFET has a bias voltage $V_{GS}$ which can give the saturation current with a zero-temperature-coefficient (ZTC). Using this principle, a temperature compensated clock generator is utilized. The temperature characteristics of the clock frequency, which is related to the output frequency of the C-F converter, can be used to compensate the overall temperature error of the converter. In the temperature range from 25° C. to 95° C., the temperature coefficient of sensitivity, after temperature compensation, is 37 ppm/° C., and the temperature coefficient of offset is 86 ppm/° C. The extra current source results in a clock frequency with a positive temperature coefficient. Since the C-F converter has negative temperature coefficient and the output frequency is proportional to the clock frequency, the temperature error can be compensated. Measured results shows that after the compensation, the temperature drift, when the input capacitor is fixed as 6.6 pF, is ±0.3% and the sensitivity drift is ±0.8%. An alternative temperature compensation method is to use an external MOS current source and a thermistor with a positive temperature coefficient.

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Dual output capacitance interface circuit for providing at least one signal indicative of a capacitance value of a condition-sensitive capacitance; the dual output capacitance interface circuit comprising:

a capacitance-to-current converter for providing a current signal indicative of the capacitance value of the condition-sensitive capacitance;

a current-to-voltage converter that is used to convert the current signal from the capacitance-to-current converter to a DC voltage output signal; and a current-to-frequency converter that is used to convert the current signal from the capacitance-to-current converter to a frequency output signal, wherein the current-to-frequency converter comprises a Schmitt trigger having an input connected to the output of an oscillator comprised of current mirrors that are switched by an output of the Schmitt trigger, to alternately charge and discharge a fixed capacitor using a mirrored current that is proportional to the current signal from the capacitance-to-current converter, thereby producing a Schmitt trigger output that provides a symmetric square wave output signal with a frequency determined by the condition-sensitive capacitance.

2. Dual output capacitance interface circuit for providing at least two output signals indicative of a capacitance value of a condition-sensitive capacitance; the dual output capacitance interface circuit comprising:

a capacitance-to-current converter for providing a current signal indicative of the capacitance value of the condition-sensitive capacitance;

a current-to-voltage converter that is used to convert the current signal from the capacitance-to-current converter to a DC voltage output signal; and a current-to-frequency converter that is used to convert the current signal from the capacitance-to-current converter to a frequency output signal.

* * * * *